(12) United States Patent
Tang et al.

(10) Patent No.: US 11,283,065 B2
(45) Date of Patent: Mar. 22, 2022

(54) GRAPHENE-CONTAINING ELECTRODE, METHOD FOR MANUFACTURING SAME, AND POWER STORAGE DEVICE USING SAME

(71) Applicant: NATIONAL INSTITUTE FOR MATERIALS SCIENCE, Ibaraki (JP)

(72) Inventors: Jie Tang, Ibaraki (JP); Kun Zhang, Ibaraki (JP); Luchang Qin, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 16/649,779

(22) PCT Filed: Aug. 22, 2018

(86) PCT No.: PCT/JP2018/030914
§ 371 (c)(1),
(2) Date: Mar. 23, 2020

(87) PCT Pub. No.: WO2019/065004
PCT Pub. Date: Apr. 4, 2019

(65) Prior Publication Data
US 2020/0220161 A1    Jul. 9, 2020

(30) Foreign Application Priority Data
Sep. 27, 2017   (JP) .............................. JP2017-185536

(51) Int. Cl.
*H01M 4/36*       (2006.01)
*C01B 32/174*    (2017.01)
(Continued)

(52) U.S. Cl.
CPC ........... *H01M 4/364* (2013.01); *C01B 32/174* (2017.08); *C01B 32/194* (2017.08); *H01G 11/24* (2013.01);
(Continued)

(58) Field of Classification Search
None
See application file for complete search history.

(56) References Cited

U.S. PATENT DOCUMENTS

2013/0295374 A1   11/2013  Tang et al.
2014/0183415 A1*  7/2014  Song .................... C01B 32/184
                                                                  252/502
(Continued)

FOREIGN PATENT DOCUMENTS

CN    103237755      8/2013
WO    2014/021257    2/2014
(Continued)

OTHER PUBLICATIONS

Office Action dated Apr. 15, 2021 in corresponding Chinese Patent Application No. 201880062578.6, with English translation.
(Continued)

*Primary Examiner* — Daniel S Gatewood
(74) *Attorney, Agent, or Firm* — Wenderoth, Lind & Ponack, L.L.P.

(57) ABSTRACT

The present invention provides an electrode that is excellent in conductivity and improves the power density and energy density of a power storage device, a method for manufacturing the same, and a power storage device using the same. The electrode of the present invention is an electrode containing at least a graphene aggregate having a particle diameter of 0.1 μm or more and less than 100 μm, wherein the graphene aggregate is an aggregate of graphene basic structures each having graphene layers among which a fibrous material is located. A method for manufacturing the electrode of the present invention comprises a step of mixing the above-mentioned graphene basic structures with at least a lower alcohol having 1 or more and 5 or less carbon atoms to form a graphene aggregate in which the graphene basic
(Continued)

structures are aggregated, and a step of forming a film using the graphene aggregate.

17 Claims, 23 Drawing Sheets

(51) Int. Cl.
| | |
|---|---|
| *C01B 32/194* | (2017.01) |
| *H01G 11/24* | (2013.01) |
| *H01G 11/26* | (2013.01) |
| *H01G 11/36* | (2013.01) |
| *H01G 11/38* | (2013.01) |
| *H01G 11/42* | (2013.01) |
| *H01G 11/86* | (2013.01) |
| *H01M 4/133* | (2010.01) |
| *H01M 4/1393* | (2010.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC .............. *H01G 11/26* (2013.01); *H01G 11/36* (2013.01); *H01G 11/38* (2013.01); *H01G 11/42* (2013.01); *H01G 11/86* (2013.01); *H01M 4/133* (2013.01); *H01M 4/1393* (2013.01); *H01M 4/587* (2013.01); *H01M 4/622* (2013.01); *H01M 4/625* (2013.01); *H01M 10/0525* (2013.01); *C01B 2202/22* (2013.01); *C01B 2204/22* (2013.01); *C01B 2204/32* (2013.01); *C01P 2004/03* (2013.01); *C01P 2004/50* (2013.01); *C01P 2004/61* (2013.01); *C01P 2004/62* (2013.01); *C01P 2006/12* (2013.01); *C01P 2006/14* (2013.01); *C01P 2006/16* (2013.01); *H01M 2004/021* (2013.01)

(56) References Cited

U.S. PATENT DOCUMENTS

| | | | |
|---|---|---|---|
| 2016/0365199 | A1* | 12/2016 | Tang ...................... H01G 11/36 |
| 2019/0115164 | A1 | 4/2019 | Tang et al. |

FOREIGN PATENT DOCUMENTS

| | | |
|---|---|---|
| WO | 2015/129820 | 9/2015 |
| WO | 2016/077880 | 5/2016 |
| WO | 2017/110295 | 6/2017 |
| WO | 2017/163464 | 9/2017 |

OTHER PUBLICATIONS

Extended European Search Report dated Jun. 4, 2021 in European Patent Application No. 18862906.7.
Wang, Haibo et al., "Exfoliated graphite nanosheets/carbon nanotubes hybrid materials for superior performance supercapacitors", J Solid State Electrochem, 2011, vol. 15, pp. 1179-1184.
International Search Report (ISR) dated Nov. 20, 2018 in International (PCT) Application No. PCT/JP2018/030914.
Office Action dated Nov. 17, 2021 in corresponding Chinese Patent Application No. 201880062578.6, with English language translation.
Official Letter issued Jan. 25, 2022 in European Patent Application No. 18862906.7.

* cited by examiner

Fig. 2

S210 — Mix graphene basic structures with lower alcohol to form graphene aggregate S220 — Form film using graphene aggregate

GRAPHENE-CONTAINING ELECTRODE, METHOD FOR MANUFACTURING SAME, AND POWER STORAGE DEVICE USING SAME

TECHNICAL FIELD

The present invention relates to a graphene-containing electrode, a method for manufacturing the same, and a power storage device using the same.

BACKGROUND ART

Power storage devices such as electric double layer capacitors (supercapacitors) and lithium-ion batteries are attracting attention because of their large capacity. The performance of such power storage devices greatly depends on the electrode material. Accordingly, development of an electrode material capable of improving the capacitance, energy density and power density is still active.

It is known to use graphene as an electrode material for an electric double layer capacitor. A graphene sheet film having graphene layers among which carbon nanotubes are interposed has been developed (see, for example, Patent Literature 1 and Patent Literature 2). According to Patent Literature 1, a capacitance of 290.6 F/g and an energy density of 62.8 Wh/kg are achieved by utilizing the conductivity of carbon nanotube in addition to the characteristics of graphene. Patent Literature 2 proposes a manufacturing method for mass-producing such a graphene sheet film using high-pressure processing.

Furthermore, an electrode material made of a stack of graphene into which pores have been introduced and carbon nanotubes has been developed (see, for example, Patent Literature 3). According to Patent Literature 3, an electrode material having graphene into which pores have been introduced by adsorption of KOH and combustion, and on which carbon nanotubes have been stacked achieves an energy density of 100 Wh/kg or more.

However, when an electric double layer capacitor is actually constructed using the electrode material described in any of Patent Literatures 1, 2 and 3, the electrode material is mixed with a conductive material and a binder (binding agent), followed by film processing. When mixed with such a conductive material and a binder, the above-mentioned electrode material may have the conductive material and the binder adsorbed on the surface of graphene, affecting the penetration and diffusion of electrolyte ions to reduce the energy characteristics of the power storage device.

Accordingly, there is a demand for development of an electrode that maintains the characteristics of the electrode material described in any of Patent Literatures 1, 2 and 3 even when mixed with a conductive material and a binder.

CITATION LIST

Patent Literature

Patent Literature 1: WO 2015/129820
Patent Literature 2: WO 2017/110295
Patent Literature 3: WO 2017/163464

SUMMARY OF INVENTION

Technical Problem

In view of the above, an object of the present invention is to provide an electrode that is excellent in conductivity and improves the power density and energy density of a power storage device, a method for manufacturing the same, and a power storage device using the same.

Solution to Problem

The electrode according to the present invention contains at least a graphene aggregate having a particle diameter of 0.1 μm or more and less than 100 wherein the graphene aggregate is an aggregate of graphene basic structures each having graphene layers among which a fibrous material is located. This electrode solves the above problem.

The graphene aggregate may have a particle diameter of 0.5 μm or more and 30 μm or less.

The graphene aggregate may have a particle diameter of 1 μm or more and 10 μm or less.

The graphene aggregate may be a porous body.

The specific surface area of the electrode measured by a BET method may be within a range of 200 $m^2/g$ or more and 1000 $m^2/g$ or less, and the pore volume of the electrode measured by a BJH method with regard to pores having a pore diameter in a range of 0.1 nm or more and 10 nm or less may be within a range of 0.1 cc/g or more and 1 cc/g or less.

The specific surface area of the electrode measured by the BET method may be within a range of 240 $m^2/g$ or more and 400 $m^2/g$ or less, and the pore volume of the electrode measured by the BJH method with regard to pores having a pore diameter in a range of 0.1 nm or more and 10 nm or less may be within a range of 0.2 cc/g or more and 0.6 cc/g or less.

The size of the graphene in the longitudinal direction may be within a range of 10 nm or more and 10 μm or less.

The fibrous material may be carbon nanotubes.

The graphene basic structures may be aggregated in a random manner.

A conductive material and a binder may be additionally contained.

The graphene aggregate, the conductive material and the binder may satisfy a weight ratio of graphene aggregate: conductive material:binder=80 to 95:0 to 10:1 to 10.

The conductive material may be a carbon material selected from the group consisting of acetylene black, channel black, furnace black and Ketjen black.

The binder may be selected from the group consisting of tetrafluoroethylene resin (PTFE), modified tetrafluoroethylene resin thereof, polyvinylidene fluoride (PVDF), sodium carboxymethylcellulose (CMC) and styrene butadiene rubber (SBR).

A method for manufacturing the above-mentioned electrode according to the present invention includes a step of mixing graphene basic structures with at least a lower alcohol having 1 or more and 5 or less carbon atoms to form a graphene aggregate in which the graphene basic structures are aggregated, the graphene basic structures each having graphene layers among which a fibrous material is located, and a step of forming a film using the graphene aggregate. This method solves the above problem.

The lower alcohol may be selected from the group consisting of methanol, ethanol, 1-propanol, 1-butanol, 2-methyl-1-propanol, 2-butanol and 2-methyl-2-propanol.

In the step of forming a graphene aggregate, the concentration of the graphene basic structures may be within a range of 0.05 g/L or more and 5 g/L or less.

In the step of forming a graphene aggregate, the concentration of the graphene basic structures may be within a range of 0.05 g/L or more and 2 g/L or less.

The specific surface area of the graphene aggregate measured by a BET method may be within a range of 250 $m^2/g$ or more and 100 $m^2/g$ or less, and the pore volume of the graphene aggregate measured by a BJH method with regard to pores having a pore diameter in a range of 0.1 nm or more and 10 nm or less may be within a range of 0.1 cc/g or more and 1 cc/g or less.

The specific surface area of the graphene aggregate measured by the BET method may be within a range of 290 $m^2/g$ or more and 350 $m^2/g$ or less, and the pore volume of the graphene aggregate measured by the BJH method with regard to pores having a pore diameter in a range of 0.1 nm or more and 10 nm or less may be within a range of 0.2 cc/g or more and 0.5 cc/g or less.

In the step of forming a graphene aggregate, water may be additionally mixed.

The lower alcohol and the water may be mixed in a volume ratio of 0.8 to 1.2:1.2 to 0.8.

The graphene basic structures may be dispersed in a solvent selected from the group consisting of N-methylpyrrolidone (NMP), N,N-dimethylformamide (DMF) and dimethyl sulfoxide (DMSO).

In the step of forming a graphene aggregate, the graphene basic structures and at least the lower alcohol may be mixed at a rotational speed of 500 rpm or more and 1500 rpm or less at room temperature for a period of 1 hour or more and 10 hours or less.

In the step of forming a film, the graphene aggregate, a conductive material and a binder may be mixed to form a film.

The power storage device according to the present invention includes an electrode and an electrolyte, wherein the electrode includes the above-mentioned electrode. This power storage device solves the above-mentioned problem.

The power storage device may be an electric double layer capacitor or a lithium ion battery.

The electrolyte may be an ionic liquid selected from the group consisting of EMI-TFSI, EMI-BF$_4$ and MPPp-TFSI, or M'OH, wherein M' is an alkali metal.

Advantageous Effects of Invention

The electrode of the present invention contains a graphene aggregate having a predetermined particle diameter, so that it becomes a homogeneous and flat film-like electrode. In the electrode of the present invention, the graphene aggregate is an aggregate of the graphene basic structures, and maintains the shape of the graphene basic structures themselves. Accordingly, it is possible to provide excellent conductivity and electrolyte ion adsorbing property of the graphene basic structures, and improve the energy density and power density of the power storage device such as an electric double layer capacitor or a lithium ion battery. When the electrode of the present invention is used, it is possible to provide a power storage device such as an electric double layer capacitor or a lithium ion battery having improved energy density and power density.

According to the method for manufacturing an electrode of the present invention, the above-mentioned graphene aggregate can be formed simply by mixing the graphene basic structures with at least a lower alcohol having 5 or less carbon atoms, followed by film formation of the graphene aggregate. Such a method does not require skilled techniques or costly equipment, but is suitable for mass production at low cost.

BRIEF DESCRIPTION OF DRAWINGS

FIG. 2 is a flowchart illustrating manufacturing process for the electrode according to the present invention.

DESCRIPTION OF EMBODIMENTS

Embodiments of the present invention will hereinafter be described with reference to the drawings. Note that the similar components are denoted by the same reference sign and the description of such components is not repeated.

Embodiment 1

In the first embodiment, it will be described an electrode according to the present invention and a method for manufacturing the electrode.

Figure 1:
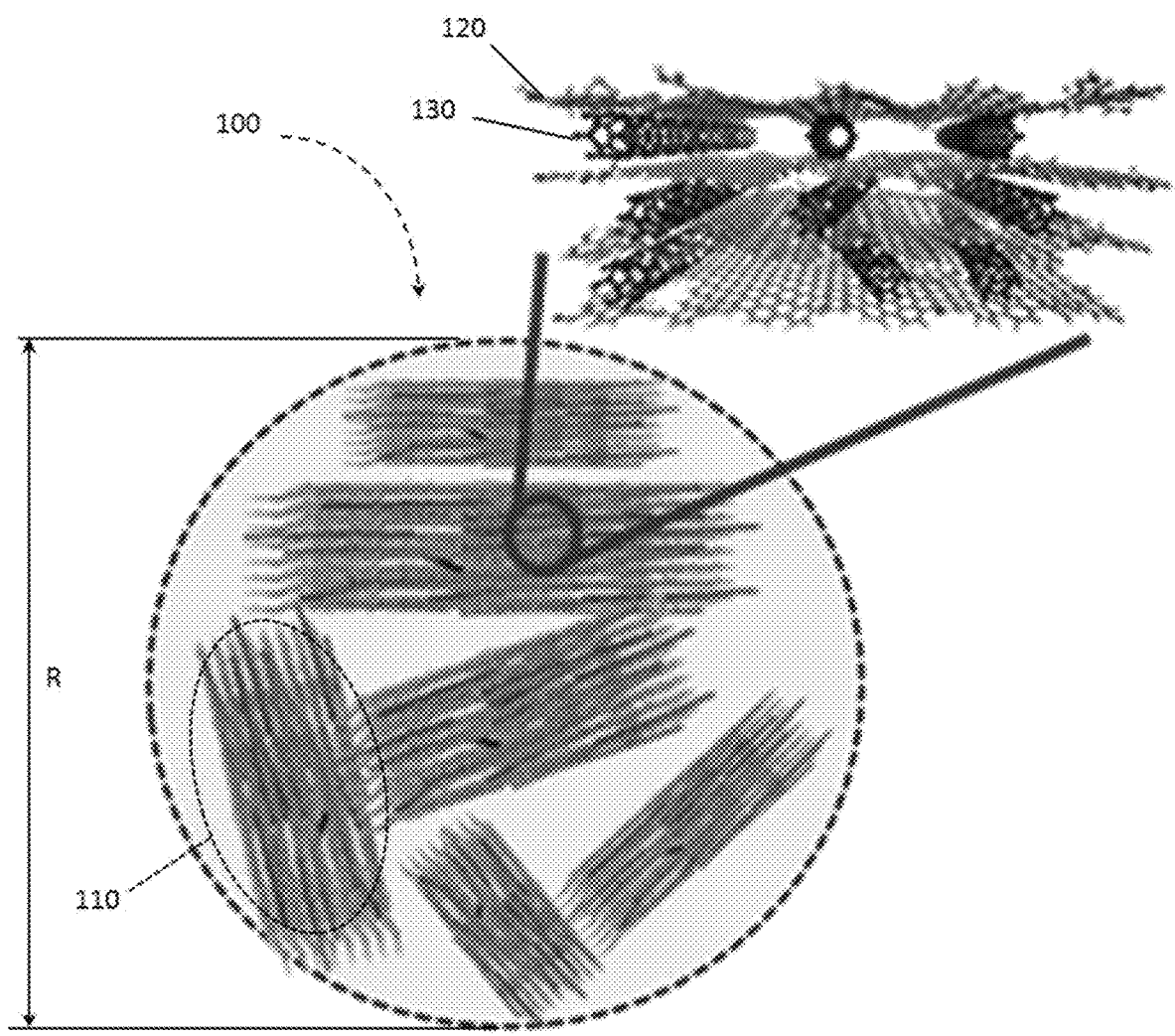
FIG. 1 is a diagram schematically illustrating a graphene aggregate constituting the electrode according to the present invention.

FIG. 1 is a diagram schematically illustrating a graphene aggregate constituting the electrode according to the present invention.

The electrode of the present invention contains a graphene aggregate 100 having a particle diameter R of 0.1 µm or more and less than 100 µm. When the particle diameter R of the graphene aggregate 100 is less than 0.1 µm, the effect of the graphene basic structure described later may not be obtained. When the particle diameter R of the graphene aggregate 100 is 100 µm or more, a formed film having a uniform surface cannot be obtained. From the viewpoint of film quality, the particle diameter R of the graphene aggregate 100 is preferably within a range of 0.5 µm or more and 30 µm or less. In such a case, a flat and good-quality film-like electrode is provided. More preferably, the particle diameter R of the graphene aggregate 100 is within a range of 1 µm or more and 10 µm or less. By limiting the particle diameter R to this range, not only the film quality but also the electrical characteristics are excellent. Here, the particle diameter R is a volume-based median diameter (d50) measured by a microtrack or a laser scattering method. More simply, the particle diameter R may be an average particle diameter determined by measuring particle diameters Rs of 100 graphene aggregate particles from an observation image of an electron microscope (for example, a scanning electron microscope). The graphene aggregate 100 preferably has a spherical shape, a rugby ball shape or a polyhedron shape. When the aspect ratio is within a range from 0.8 to 1.2, the graphene aggregate 100 can be processed into a flat film-like electrode having excellent characteristics.

The graphene aggregate 100 is an aggregate of graphene basic structures 110 formed by aggregation of the graphene basic structures 110. The graphene basic structure 110 is intended to be one in which one or more fibrous materials 130 are located among the layers of graphene 120. With such a structure, the graphene basic structures 110 become an electrode material capable of remarkably increasing the capacitor performance. Electrolyte ions can penetrate through the surface of the graphene 120 of the graphene basic structure 110 and the electrolyte ions that have penetrated can move between the layers of the graphene 120 easily, so that the graphene 120 and the electrolyte ions can exchange electrons with each other. As a result, the capacitance can be significantly increased, and the energy density and power density can be improved. The graphene basic structures 110 are manufactured by, for example, the method described in Patent Literature 1 or Patent Literature 2.

In the graphene basic structure 110, the graphene 120 may be provided with pores (not shown) on the surface. In such a case, penetration and movement of electrolyte ions are promoted, leading to improvement of the energy density and power density. The pore diameter is within a range of 0.4 nm or more and 10 nm or less, more preferably within a range of 1 nm or more and 5 nm or less, from the viewpoint of penetration of electrolyte ions. The graphene basic structure 110 having such pores is manufactured, for example, with reference to Patent Literature 3.

The graphene 120 may have a functional group such as a carboxy group or a hydroxyl group (not shown). Such a functional group remains on the surface of the graphene 120 during manufacturing, and even when the functional group is present, there is no inferiority in penetration and movement of electrolyte ions and conductivity.

The size of the graphene 120 in the longitudinal direction is preferably within a range of 10 nm or more and 10 µm or less. Within such a range, the graphene basic structures 110 tend to aggregate. More preferably, the size of the graphene 120 in the longitudinal direction is within a range of 0.5 µm or more and 5 µm or less. Within this range, the graphene aggregate 100 formed by aggregation of the graphene basic structures 110 becomes a porous body.

The fibrous material 130 is located among the layers of the graphene 120 to function as spacers. Accordingly, the fibrous material 130 has an average value of the outer diameter preferably within the range of 0.4 nm or more and 5.0 nm or less, more preferably within the range of 1.0 nm or more and 3.0 nm or less. The average value of the outer diameter of the fibrous material may be, for example, an arithmetic average value when observed using a transmission electron microscope with an arbitrary magnification, and the outer diameters of a plurality of arbitrarily extracted substances of the fibrous material are measured in a visual field in which the fibrous material accounts for a certain proportion of the visual field area.

Such a fibrous material 130 preferably has conductivity or semiconductivity in addition to spacer function. In such a case, the electroconductivity of the whole electrode can be improved. Such a fibrous material 130 includes, for example, carbon nanotube, cellulose nanofiber, metal nanowire or the like. Among them, carbon nanotube has excellent compatibility with the graphene 120. Hereinafter, for ease of understanding, it will be described carbon nanotube as the fibrous material 130.

The carbon nanotube 130 may be an assembly in which a plurality of carbon nanotubes are present, or may be a single body. The existence form is not particularly limited. Furthermore, the carbon nanotube 130 may exist independently, or may exist in the form of bundles, entanglements or the like, or a mixed form thereof. Various numbers of the layers and various outer diameters may be involved.

The carbon nanotube 130 is a single-wall carbon nanotube (SWNT), double-wall carbon nanotube (DWNT) or multi-wall carbon nanotube (MWNT), preferably a single-wall carbon nanotube. A single-wall carbon nanotube, having high conductivity of $10^4$ S/cm or more, improves the conductivity of the electrode. Accordingly, the capacitor performance can be improved.

In the graphene basic structure 110, the weight ratio of the graphene 120 with respect to the carbon nanotube 130 preferably satisfies a range of 1 or more and 50 or less. When the weight ratio is less than 1, the graphene 120 has too low content to function as an electrode. When the weight ratio exceeds 50, the carbon nanotube 130 does not function as a spacer. Preferably, the weight ratio satisfies a range of 5 or more and 15 or less.

The graphene aggregate 100 is formed by aggregation of the graphene basic structures 110 as described above. In the present invention, the graphene basic structures 110 are aggregated such that they come into point contact with each other, and further the plane surfaces of the graphene 120 are not aligned but arranged in a random manner. In such a case, the graphene aggregate 100 functions as a porous body having pores through which electrolyte ions can move.

Specifically, the specific surface area of the graphene aggregate 100 measured by a BET method is in a range of 250 $m^2$/g or more and 1000 $m^2$/g or less, and the pore volume of the graphene aggregate 100 measured by a BJH method with regard to pores having a pore diameter in a range of 0.1 nm or more and 10 nm or less satisfies a range of 0.1 cc/g or more and 1 cc/g or less. When the graphene aggregate 100 has such a porosity, the graphene basic structure 110 exhibits characteristics even in the graphene aggregate 100. More preferably, the specific surface area of the graphene aggregate 100 measured by the BET method is in a range of 290 $m^2/g$ or more and 350 $m^2/g$ or less, and the pore volume of the graphene aggregate 100 measured by the BJH method with regard to pores having a pore diameter in a range of 0.1 nm or more and 10 nm or less satisfies a range of 0.2 cc/g or more and 0.5 cc/g or less.

The electrode of the present invention contains the graphene aggregate 100 in which the graphene basic structures 110 are aggregated, so that, preferably, the specific surface area of the electrode measured by a BET method is in a range of 200 $m^2/g$ or more and 1000 $m^2/g$ or less, and the pore volume of the electrode measured by a BJH method with regard to pores having a pore diameter in a range of 0.1 nm or more and 10 nm or less satisfies a range of 0.1 cc/g or more and 1 cc/g or less. In such a case, the electrode of the present invention provides not only high conductivity but also adsorption of electrolyte ions. More preferably, the specific surface area of the electrode of the present invention measured by the BET method is in a range of 240 $m^2/g$ or more and 400 $m^2/g$ or less, and the pore volume of the electrode measured by the BJH method with regard to pores having a pore diameter in a range of 0.1 nm or more and 10 nm or less satisfies a range of 0.2 cc/g or more and 0.6 cc/g or less. This further ensures adsorption and movement of electrolyte ions. Still more preferably, the specific surface area of the electrode of the present invention measured by the BET method is in a range of 240 $m^2/g$ or more and 350 $m^2/g$ or less, and the pore volume of the electrode measured by the BJH method with regard to pores having a pore diameter in a range of 0.1 nm or more and 10 nm or less satisfies a range of 0.2 cc/g or more and 0.35 cc/g or less. In such a case, in addition to adsorption and movement of electrolyte ions, a density and low sheet resistance mentioned later can be provided to the electrode.

In addition to the graphene aggregate 100, the electrode of the present invention may further contain a conductive material and a binder. In such a case, the film-like electrode will have a smooth surface. In this case, the graphene aggregate 100, the conductive material and the binder preferably satisfy a weight ratio of graphene aggregate:conductive material:binder=80 to 95:0 to 10:1 to 10. By mixing in such a weight ratio, the electrode will have conductivity, and achieve high power density and energy density when applied to a capacitor. In the above-mentioned ratio, 80 to 95 means 80 or more and 95 or less, 0 to 10 means greater than 0 and 10 or less, and 1 to 10 means 1 or more and 10 or less, and the total amount of the graphene aggregate, the conductive material and the binder is adjusted to be 100 parts by weight.

The conductive material is not particularly limited as long as it is used as a conductive material in a normal electrode. In consideration of dispersibility with the graphene aggregate 100, a preferable example of the conductive material is a carbon material selected from the group consisting of acetylene black, channel black, furnace black and Ketjen black.

The binder is not particularly limited as long as it is used as a binder in a normal electrode, but typically includes an organic solvent binder and an aqueous binder. Examples of the organic solvent binder include tetrafluoroethylene resin (PTFE), modified tetrafluoroethylene resin thereof and polyvinylidene fluoride (PVDF). Examples of the aqueous binder include sodium carboxymethyl cellulose (CMC) and styrene butadiene rubber (SBR). In particular, CMC and SBR may be used in combination in an aqueous binder.

The electrode of the present invention contains at least the graphene aggregate 100 described above, and is generally used in the form of a film. In this case, the film thickness is preferably 20 µm or more and 100 µm or less. When the thickness is within this range, the electrode is excellent in a handling property and it is easy to apply it to current collectors. When the electrode is applied to various power storage devices, high power density and energy density are achieved.

The electrode of the present invention preferably has a density within a range of 0.2 $g/cm^3$ or more and 0.7 $g/cm^3$ or less. When the density is within this range, electrolyte ions can easily reach and move into the graphene aggregate 100. The electrode of the present invention more preferably has a density within a range of 0.4 $g/cm^3$ or more and 0.6 $g/cm^3$ or less.

Next, it will be described a method for manufacturing the electrode according to the present invention.

FIG. 2 is a flowchart illustrating manufacturing process for the electrode according to the present invention.

Step S210: graphene basic structures each having graphene layers among which a fibrous material is located are mixed with at least a lower alcohol having 1 or more and 5 or less carbon atoms to form a graphene aggregate. As the graphene basic structures, for example, those manufactured by the method described in any of Patent Literatures 1, 2 and 3 can be used. The inventors of the present application have found that only mixing the graphene basic structures with the above-mentioned lower alcohol can form a graphene aggregate (100 in FIG. 1) in which the graphene basic structures are aggregated and the particle diameter is 0.1 µm or more and less than 100 µm.

The lower alcohol is preferably selected from the group consisting of methanol, ethanol, 1-propanol, 1-butanol, 2-methyl-1-propanol, 2-butanol and 2-methyl-2-propanol. These lower alcohols can surely aggregate the graphene basic structures. Among them, ethanol is preferable because it promotes aggregation.

In step S210, the graphene basic structures may be mixed with water in addition to the lower alcohol. In such a case, the dispersibility of the graphene basic structures in a dispersion medium is enhanced, so that formation of the graphene aggregate is promoted. The water may be pure water, ultrapure water, deionized water, distilled water or the like. When the lower alcohol and water are used, it is preferable to use ethanol and water in combination because the graphene aggregate having a particle diameter within a range of 1 µm or more and 10 µm or less can be obtained.

The lower alcohol and water are preferably mixed in a volume ratio of 0.8 to 1.2:1.2 to 0.8. This promotes formation of the graphene aggregate. The lower alcohol and water are more preferably mixed at a volume ratio of 0.95 to 1.05:1.05 to 0.95. In the above-mentioned ratio, 0.8 to 1.2 means 0.8 or more and 1.2 or less, 1.2 to 0.8 means 1.2 or more and 0.8 or less, 0.95 to 1.05 means 0.95 or more and 1.05 or less, and 1.05 to 0.95 means 1.05 or more and 0.95 or less.

In step S210, the concentration of the graphene basic structure in a dispersion medium is adjusted to be in a range of 0.05 g/L or more and 5 g/L or less. Within this range, formation of the graphene aggregate is promoted. Preferably, the concentration of the graphene basic structure in a dispersion medium is adjusted to be in a range of 0.05 g/L or more and 2 g/L or less. Within this range, formation of a graphene aggregate having a controlled particle diameter is promoted. Preferably, the concentration of the graphene basic structure in a dispersion medium is adjusted to be in a range of 0.05 g/L or more and 0.2 g/L or less, so that formation of the graphene aggregate is surely promoted.

The graphene basic structures may be dispersed in a solvent selected from the group consisting of N-methylpyrrolidone (NMP), N,N-dimethylformamide (DMF) and dimethyl sulfoxide (DMSO). Among them, NMP excellently disperses the graphene basic structures, so that when mixed with lower ethanol (and water), formation of the graphene aggregate is promoted. In this case, the final concentration of the graphene basic structure in a dispersion medium may also be adjusted such that it satisfies the above-mentioned range.

In step S210, the graphene basic structures and the lower alcohol (and water) are preferably mixed at a rotational speed of 500 rpm or more and 1500 rpm or less at room temperature for a period of 1 hour or more and 10 hours or less. This promotes formation of the graphene aggregate. When this condition is not satisfied, the graphene aggregate may not be formed well or may not have a desired particle diameter. In this specification, the room temperature means a temperature range of 15° C. or more and 35° C. or less.

In step S210, the mixing is preferably performed until it is satisfied that the specific surface area of the graphene aggregate measured by a BET method is in a range of 250 $m^2$/g or more and 1000 $m^2$/g or less, and the pore volume of the graphene aggregate measured by a BJH method with regard to pores having a pore diameter in a range of 0.1 nm or more and 10 nm of less is in a range of 0.1 cc/g or more and 1 cc/g or less. When the graphene aggregate has such a porosity, the graphene basic structure can exhibit characteristics even in the graphene aggregate. More preferably, it is preferable that the specific surface area of the graphene aggregate measured by a BET method is in a range of 290 $m^2$/g or more and 350 $m^2$/g or less, and the pore volume of the graphene aggregate measured by a BJH method with regard to pores having a pore diameter in a range of 0.1 nm or more and 10 nm of less satisfies a range of 0.2 cc/g or more and 0.5 cc/g or less. When this range is satisfied, an electrode having the above-mentioned density and low sheet resistance can be provided. Still more preferably, the pore volume of the graphene aggregate measured by a BJH method with regard to pores having a pore diameter in a range of 0.1 nm or more and 10 nm of less satisfies a range of 0.4 cc/g or more and 0.5 cc/g or less. In such a case, the above-mentioned density and low sheet resistance, as well as high specific surface area and large pore volume can be provided to the electrode.

Following step S210, the solvent may be removed by filtration, and the graphene aggregate may be dried before use.

Step S220: a film is formed using the graphene aggregate obtained in step S210. For film formation, for example, a dispersion liquid in which the graphene aggregate is dispersed may be applied to a current collector or the like, or may be spin-coated or cast. Alternatively, a current collector may be immersed in the dispersion to form a film. A dispersion medium for dispersing the graphene aggregate may be NMP, DMF, DMSO or the like. After film formation, the dispersion medium is removed by drying.

In step S220, the graphene aggregate, the conductive material and the binder may be mixed to form a film. Because the conductive material and the binder are as mentioned above, their descriptions are omitted. The graphene aggregate, the conductive material and the binder are preferably mixed such that they satisfy a weight ratio of graphene aggregate:conductive material:binder=80 to 95:0 to 10:1 to 10. In such a case, a flat film-like electrode can be provided, which makes it possible to facilitate formation of a sheet by rolling rollers or a roll press machine. After film formation, the solvent may be removed by drying or the like, if necessary.

Embodiment 2

In Embodiment 2, it will be described an electric double layer capacitor as a power storage device using the electrode according to the present invention.

Figure 3:
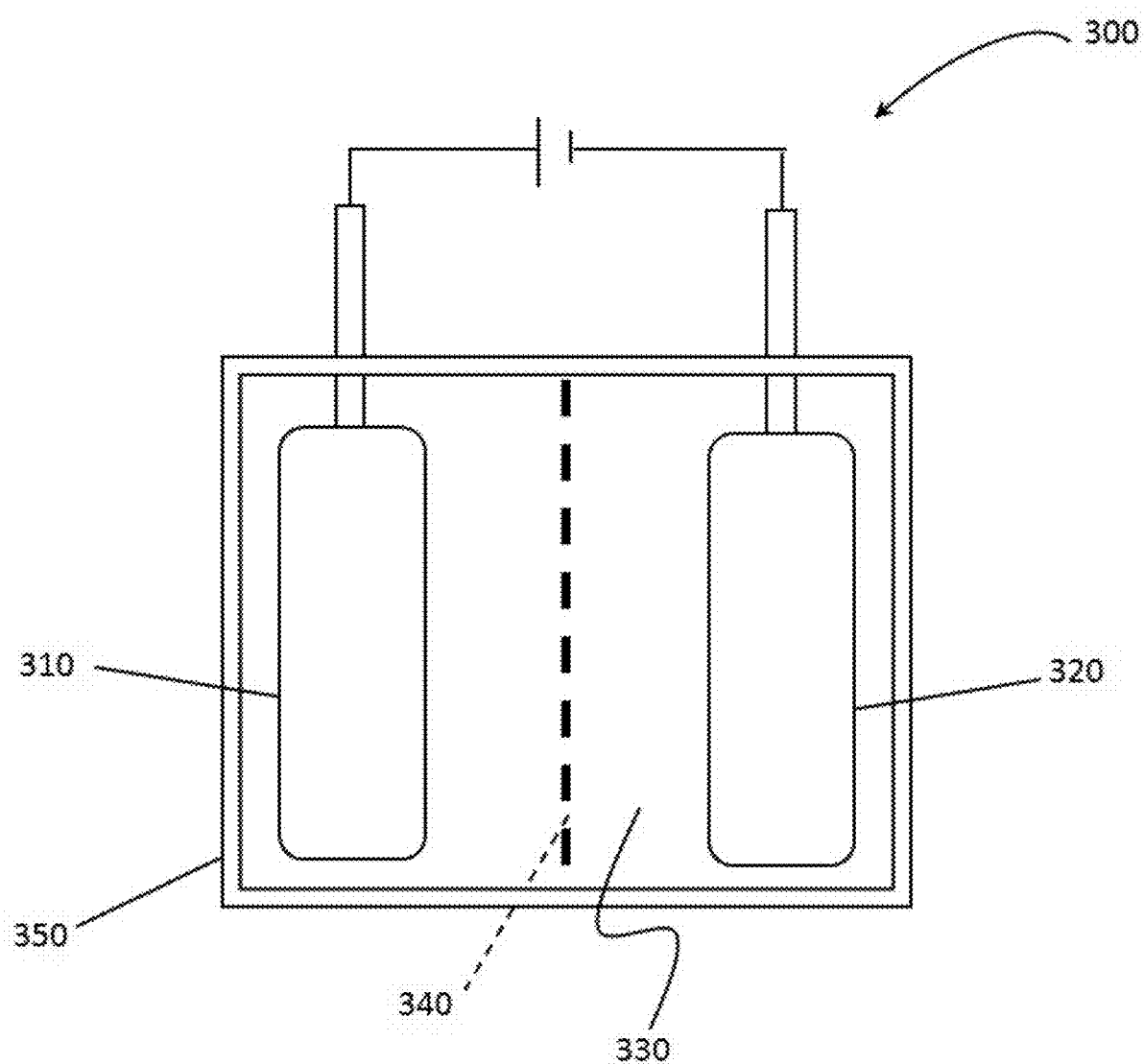
FIG. 3 is a schematic diagram illustrating the electric double layer capacitor according to the present invention.

FIG. 3 is a schematic diagram illustrating an electric double layer capacitor according to the present invention.

The electric double layer capacitor of the present invention includes at least an electrode and an electrolyte. For the electric double layer capacitor 300 in FIG. 3, a positive electrode 310 and a negative electrode 320 as electrodes are immersed in an electrolyte 330. The positive electrode 310 and the negative electrode 320 include electrodes containing the graphene aggregate 100 described in the Embodiment 1. The electrolyte 330 is an ionic liquid selected from the group consisting of 1-ethyl-3-methylimidazoliumbis(trifluoromethanesulfonyl)imide (EMI-TFSI), 1-ethyl-3-methylimidazolium borofluoride (EMI-$BF_4$) and 1-methyl-1-propylpiperidiniumbis(trifluoromethylsulfonyl)imide (MPPp-TFSI), or M'OH (M' is an alkali metal).

The electric double layer capacitor 300 further includes a separator 340 between the positive electrode 310 and the negative electrode 320 to isolate the positive electrode 310 and the negative electrode 320 from each other.

The material of the separator 340 is a material selected from, for example, fluorine-based polymer, polyether such as polyethylene oxide and polypropylene oxide, polyolefin such as polyethylene and polypropylene, polyacrylonitrile, polyvinylidene chloride, polymethyl methacrylate, polymethyl acrylate, polyvinyl alcohol, polymethacrylonitrile, polyvinyl acetate, polyvinyl pyrrolidone, polyethyleneimine, polybutadiene, polystyrene, polyisoprene, polyurethane-based polymer, and derivatives thereof, cellulose, paper, and nonwoven fabric.

For the electric double layer capacitor 300, the above-mentioned positive electrode 310, the negative electrode 320, the electrolyte 330 and the separator 340 are accommodated in a cell 350. In addition, each of the positive electrode 310 and the negative electrode 320 contains an existing current collector.

Such an electric double layer capacitor 300 may be a chip type, coin type, mold type, pouch type, laminate type, cylindrical type or square type capacitor etc., or may be used such that a plurality of the electric double layer capacitors 300 are connected to each other to form a module.

Next, it will be described operation of the electric double layer capacitor 300 in FIG. 3.

When a voltage is applied to the electric double layer capacitor 300, electrolyte ions (anions) of the electrolyte 330 are adsorbed on the positive electrode 310, and electrolyte ions (cations) of the electrolyte 330 are adsorbed on the negative electrode 320. As a result, an electric double layer is formed on each of the positive electrode 310 and the negative electrode 320, leading to charging. Here, because the positive electrode 310 and the negative electrode 320 are formed from the graphene aggregate described in Embodiment 1, adsorption and diffusion of cations and anions by the aggregated graphene basic structures so easily occur that high rate characteristics can be achieved. In addition, because the positive electrode 310 and the negative electrode 320 are formed from the graphene aggregate described in Embodiment 1, many electrolyte ions are adsorbed not only on the surface of the aggregated graphene basic structures but also inside thereof to form an electric double layer. As a result, exchange of electrons increases between the graphene and electrolyte ions, so that high energy density can be achieved.

When the charged electric double layer capacitor 300 is connected to a circuit such as a resistor, anions and cations adsorbed on the positive electrode 310 and the negative electrode 320 respectively are desorbed, leading to discharging. Here again, because the positive electrode 310 and the negative electrode 320 are formed from the graphene aggregate described in Embodiment 1, desorption and diffusion of electrolyte ions so easily occur that high rate characteristics and power density can be achieved. In addition, because the electrodes are excellent in electroconductivity, the power density can also be improved with ease of desorption and diffusion.

As described above, the electric double layer capacitor 300 of the present invention can sufficiently exhibit the characteristics of the graphene basic structure in the graphene aggregate to provide quick charging and achieve high energy density and high power density. In addition, an electric double layer is formed for charge/discharge, so that the electric double layer capacitor 300 is excellent for repeated use. The electric double layer capacitor 300 of the present invention can be used for wind power generators, electric vehicles and the like.

Note that although a limited description to an electric double layer capacitor is made here, it should be understood that the electrode of the present invention is applicable to power storage devices such as lithium ion batteries, in addition to electric double layer capacitors.

Next, the present invention will be described in detail with reference to specific examples; however, the present invention is not limited to these examples.

EXAMPLES

Comparative Example 1

In Comparative Example 1, graphene basic structures manufactured by the method described in Patent Literature 2 were used, and an attempt was made to manufacture a graphene aggregate by mixing the graphene basic structures with water according to the conditions shown in Table 1.

The graphene basic structures were manufactured as follows. Single-wall carbon nanotubes manufactured by the Super-growth method (manufactured by Zeon Corporation, hereinafter, also referred to as "SGCNT") were suspended in NMP (1 L) at a concentration of 0.05 mg/mL, and then dispersed by sonication for 30 minutes to prepare a dispersion. Subsequently, to the dispersion, 1 g of graphene manufactured by the exfoliation method (hereinafter, also referred to as "exfoliated graphene") was added at a mass ratio of SGCNT:TRGO=1:20 to prepare a raw material suspension.

This raw material suspension was supplied through the raw material introduction section of the composite apparatus (FIG. 1 in Patent Literature 2) at a pressure of 100 MPa, and was continuously passed through the compositing module five times to prepare a dispersion containing the graphene basic structures (concentration: 1 g/L). A portion of the dispersion was filtered and dried, followed by observation with a scanning electron microscope (SEM). Then, the BET specific surface area and BJH pore volume were evaluated from the nitrogen adsorption/desorption isotherm (77K) and pore distribution, respectively.

Figure 4:
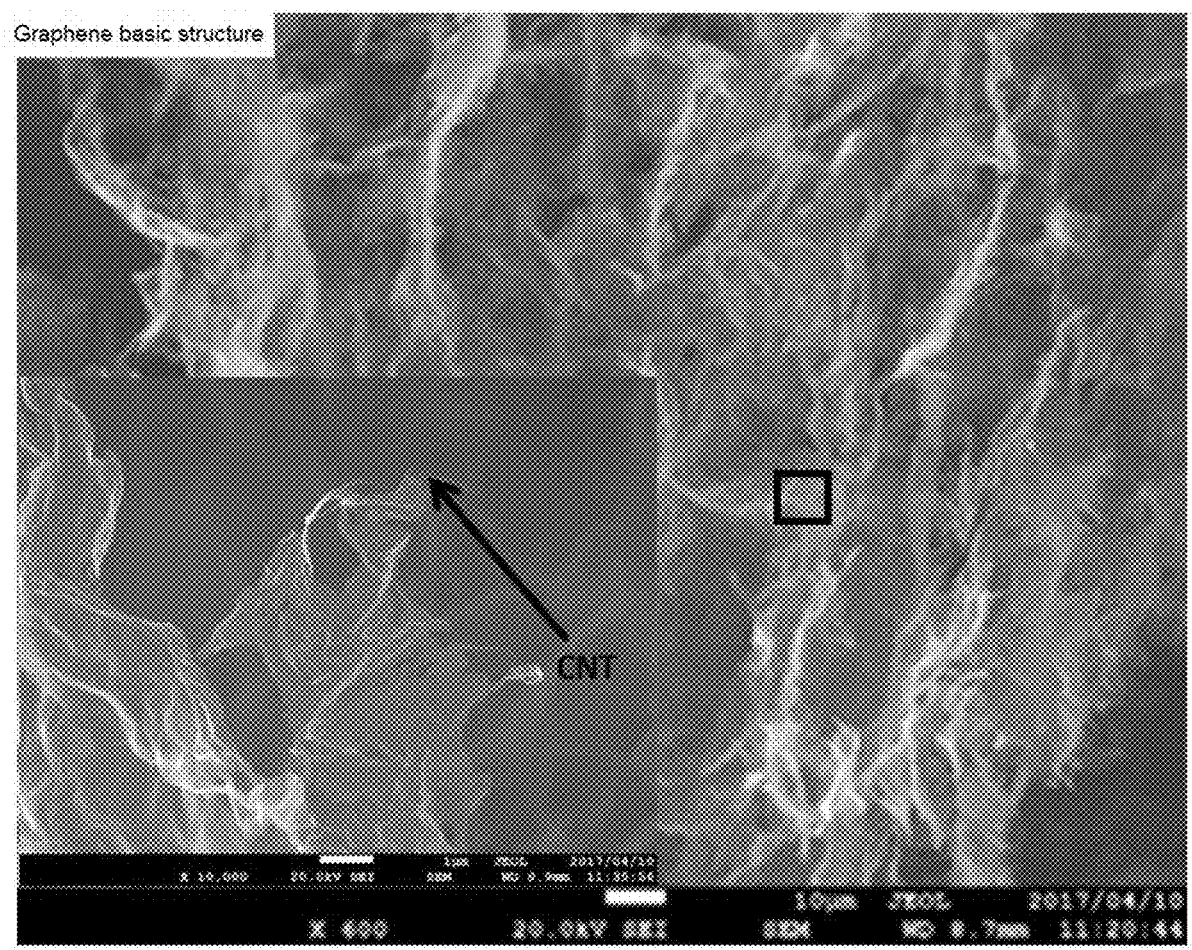
FIG. 4 is a diagram illustrating SEM images of the graphene basic structure.

FIG. 4 is a diagram illustrating SEM images of the graphene basic structure.

According to FIG. 4, the graphene having a size in the longitudinal direction in a range of 0.5 µm or more and 5 µm or less was confirmed as a whole. As shown in the enlarged view of the area indicated by the square in the diagram, a graphene basic structure was confirmed in which carbon nanotubes were inserted into the spaces in the graphene. In addition, it was confirmed that the outer diameter of the carbon nanotubes was within a range of 1.0 nm or more and 3.0 nm or less.

Figure 5:
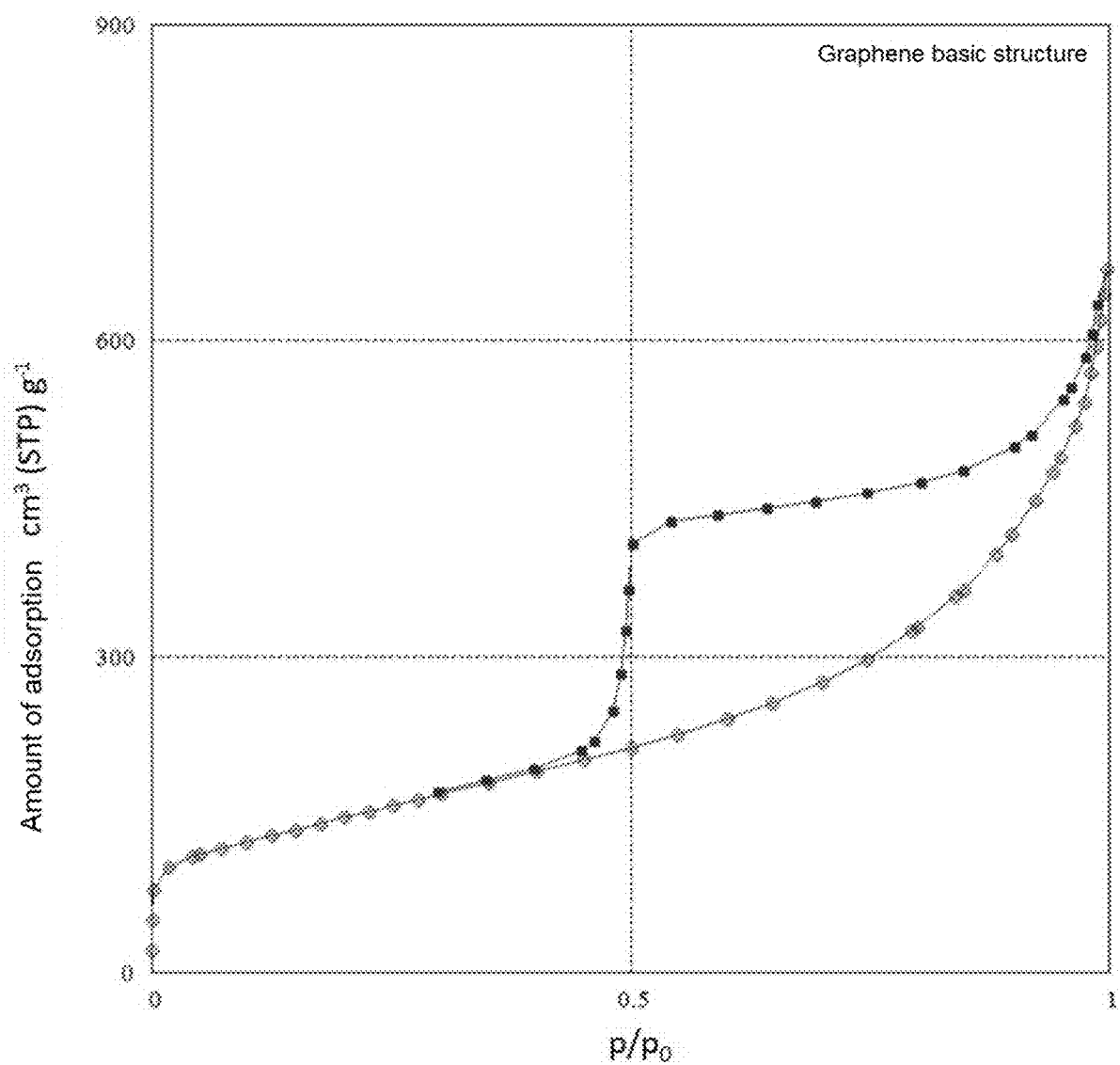
FIG. 5 is a diagram illustrating the nitrogen adsorption/desorption isotherm of the graphene basic structure.

FIG. 5 is a diagram illustrating the nitrogen adsorption/desorption isotherm of the graphene basic structure.

Figure 6:
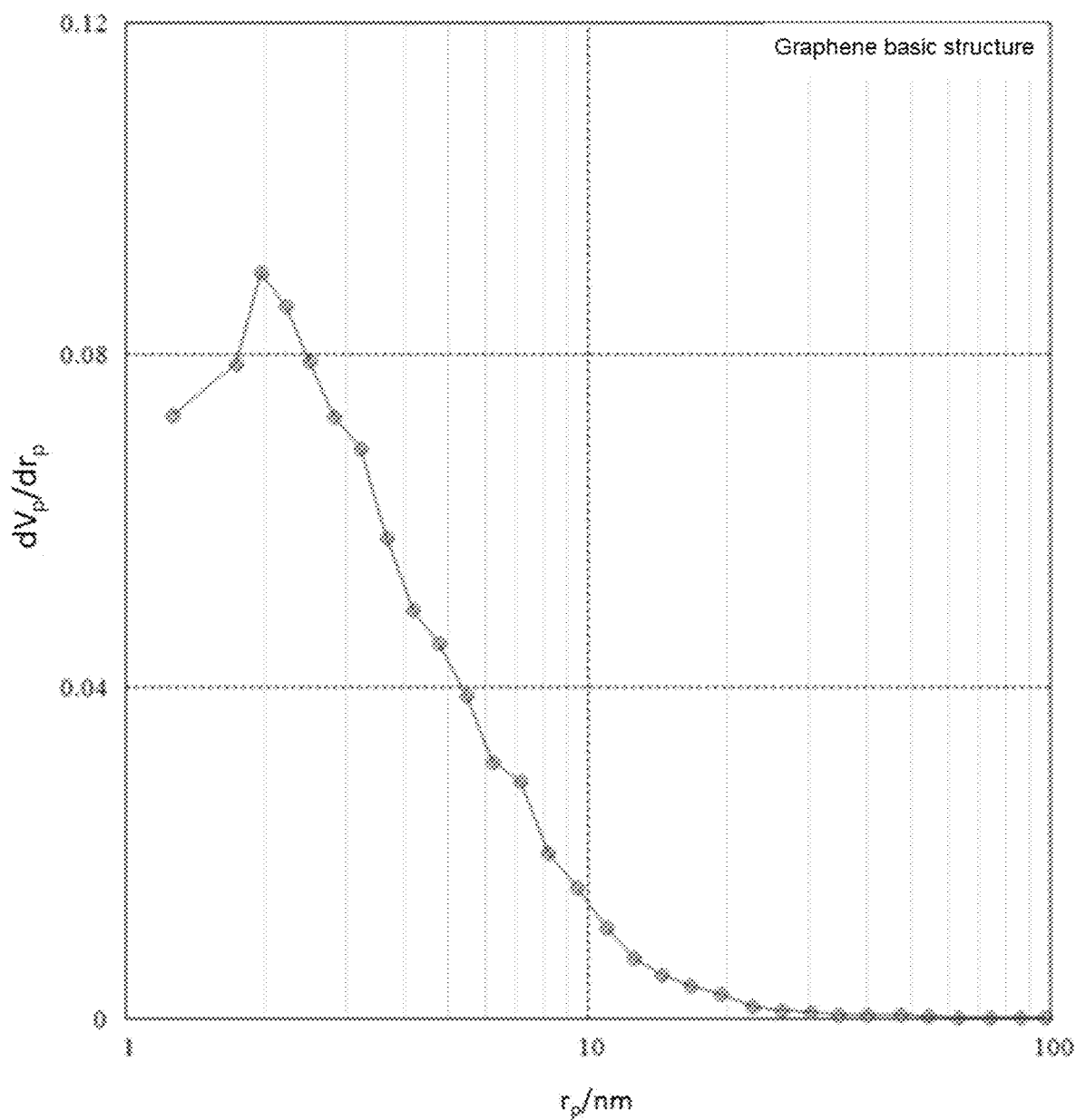
FIG. 6 is a diagram illustrating the pore distribution of the graphene basic structure.

FIG. 6 is a diagram illustrating the pore distribution of the graphene basic structure.

According to FIG. 5, it was found that the adsorption/desorption isotherm of the graphene basic structure corresponded to the IUPAC type IV, and meso-pores existed. The specific surface area of the graphene basic structure calculated from the adsorption/desorption isotherm was 410 m$^2$/g. According to FIG. 6, there was a peak in the range of 0.1 nm or more and 10 nm or less, and the pore volume in that range was 0.493 cc/g. From these results, it was confirmed that the graphene basic structures were obtained by the method described in Patent Literature 2.

Figure 7:
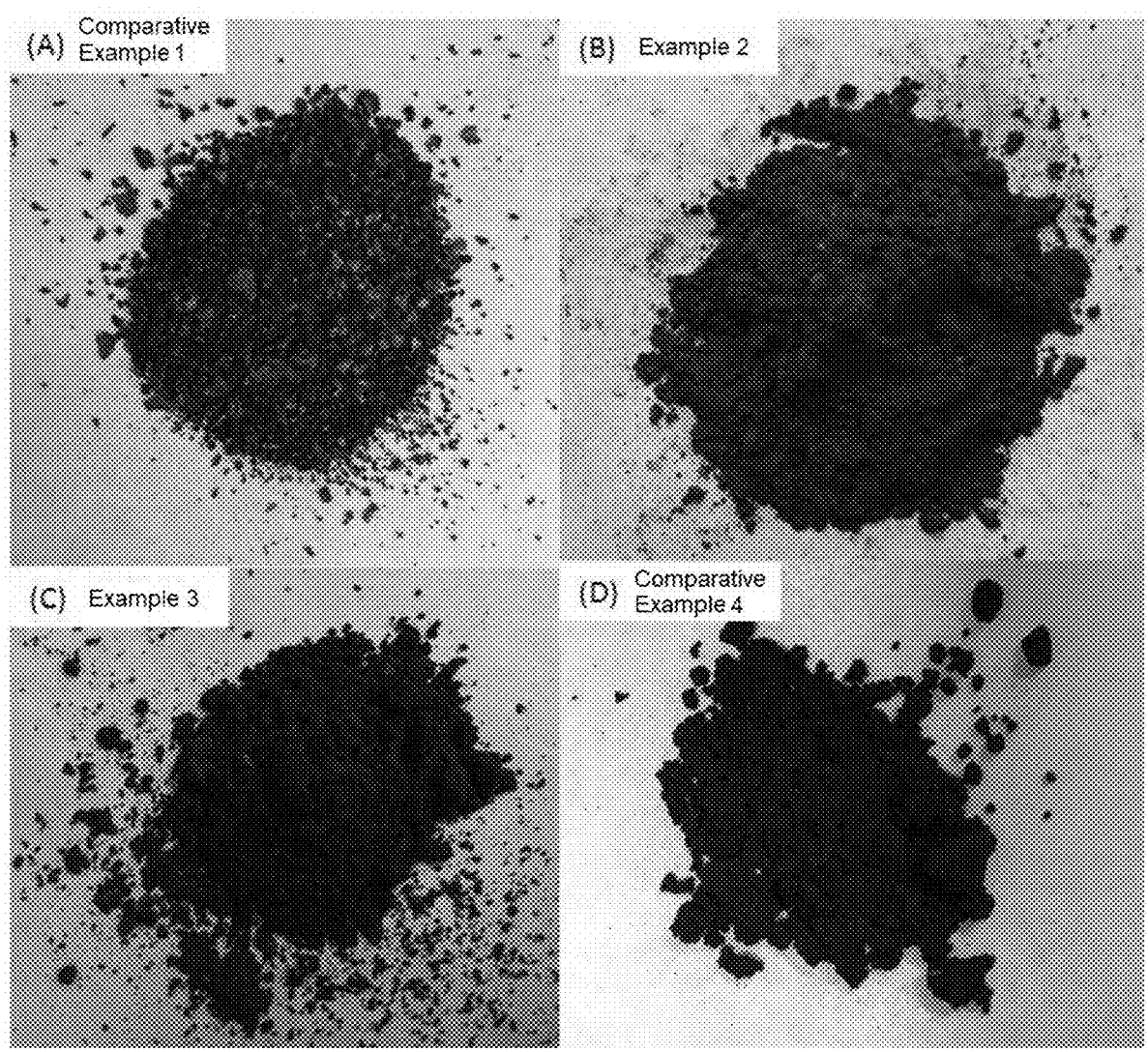
FIGS. 7(A) to 7(D) are diagrams illustrating the appearance of the graphene aggregates of Comparative Examples/Examples 1 to 4.
Figure 8:
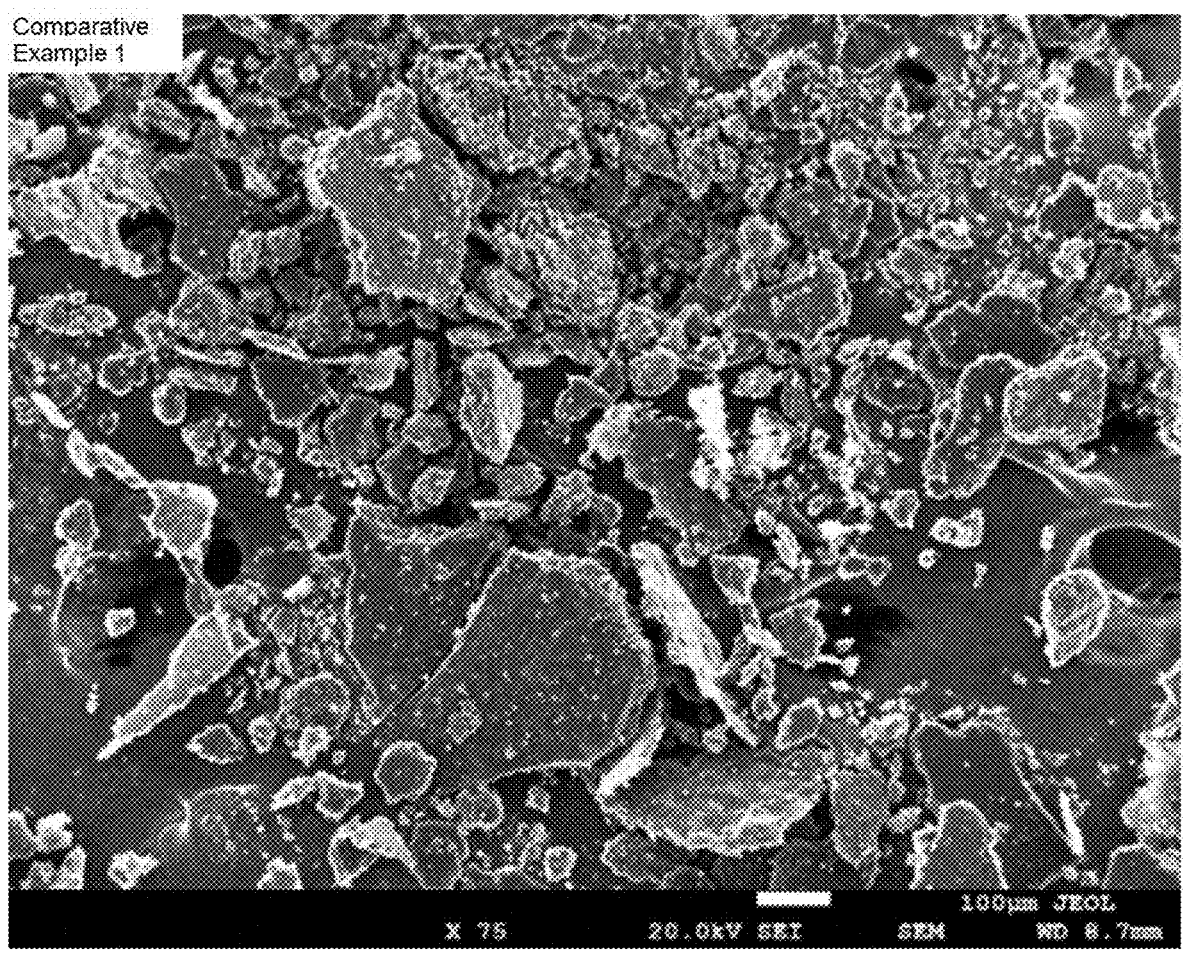
FIG. 8 is a diagram illustrating an SEM image of the graphene aggregate of Comparative Example 1.

The dispersion (500 mL) containing the graphene basic structures obtained in this way and water (5 L) were mixed and stirred under the conditions shown in Table 1. The concentration of the graphene basic structure in the dispersion was 0.091 g/L. After stirring, the solvent was removed by filtration and the product was dried in vacuum at 50° C. for 2 days. The dried product was observed. The results are shown in FIGS. 7 and 8.

Example 2

In Example 2, graphene basic structures manufactured by the method described in Patent Literature 2 were used, and a graphene aggregate was manufactured by mixing the graphene basic structures with ethanol (5 L) according to the conditions shown in Table 1 (step S210 in FIG. 2). Because the manufacturing procedure of the graphene aggregate is the same as Comparative Example 1 except that water is changed to ethanol, the description is omitted.

Figure 9:
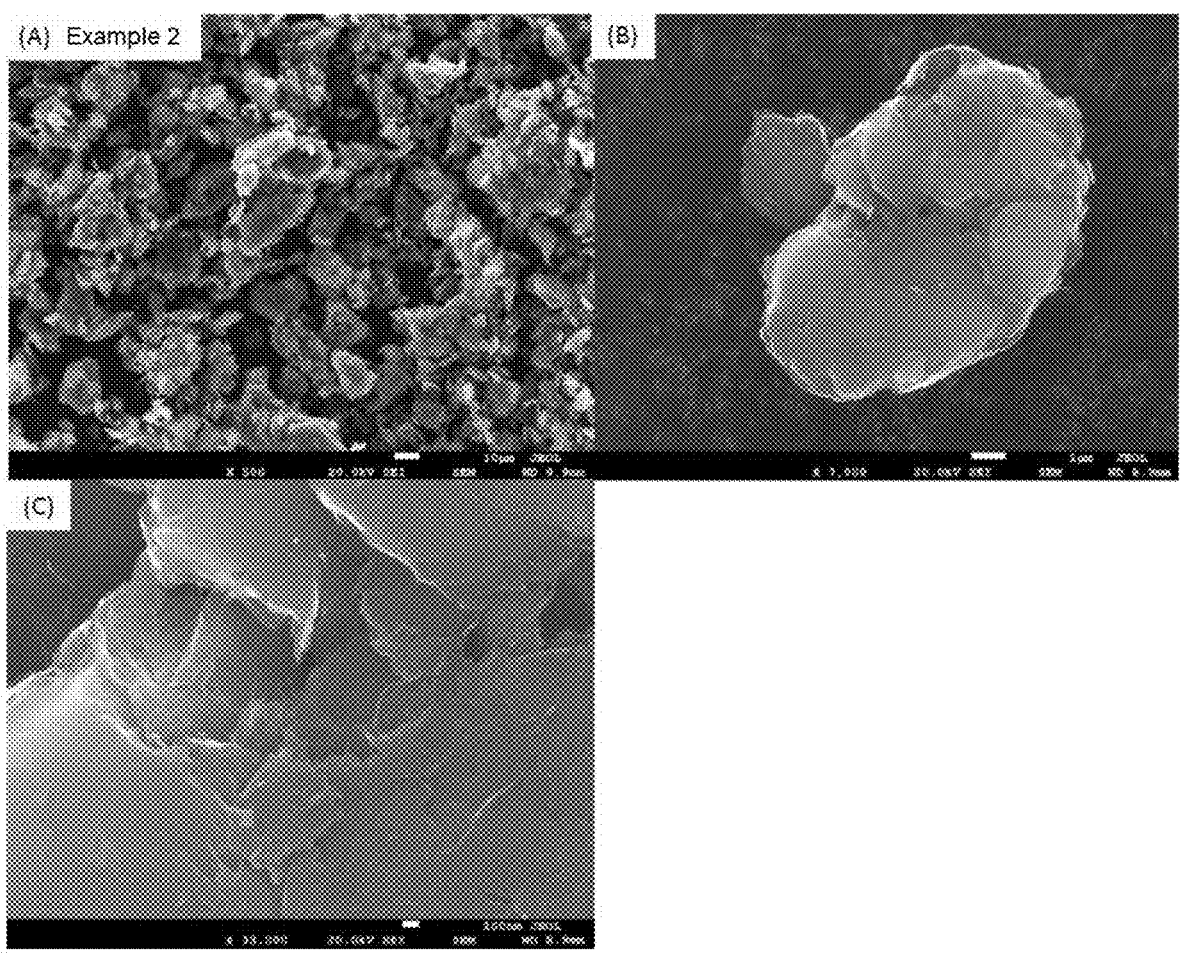
FIGS. 9(A) to 9(C) are diagrams illustrating SEM images of the graphene aggregate of Example 2.

The dried product was observed in a similar way to Comparative Example 1, and confirmed to be the graphene aggregate of the present invention. The observation results are shown in FIGS. 7 and 9. The BET specific surface area and BJH pore volume of the product were evaluated from the nitrogen adsorption/desorption isotherm (77K) and pore distribution, respectively. The results are shown in Table 2.

Next, a film was formed using the obtained product (graphene aggregate) (step S220 in FIG. 2). The product was dispersed in NMP and mixed with Ketjen black (KB) as a conductive material and CMC and SBR as a binder to prepare a slurry. The product (the graphene aggregate of the present invention), the conductive material (KB) and the binder (mixture of CMC and SBR) were mixed at a weight ratio of 86:5:9. CMC and SBR were mixed at a weight ratio of 5:4. This slurry was cast on an Al (aluminum) current collector and dried in vacuum at 120° C. for 24 hours to prepare an electrode film. The dried electrode film was observed, and the BET specific surface area and BJH pore volume were evaluated from the nitrogen adsorption/desorption isotherm (77K) and pore distribution, respectively.

Figure 14:
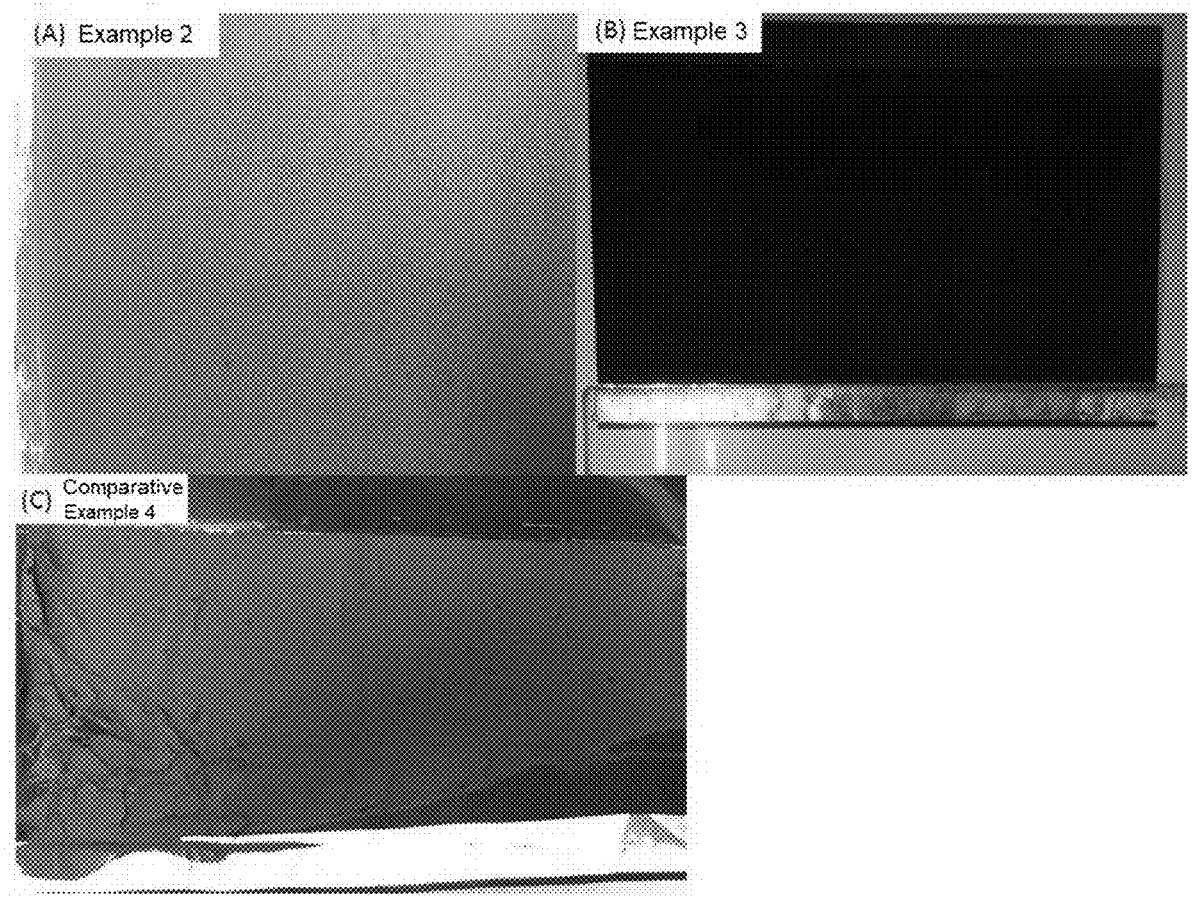
FIGS. 14(A) to 14(C) are diagrams illustrating the state of the electrode films of Examples/Comparative Examples 2 to 4.

In addition, the density and the sheet resistance of the electrode film were determined by the X-ray reflectometry (XRR) method and four-point probe method, respectively. These results are shown in FIG. 14 and Table 3.

Next, a coin-type electric double layer capacitor was manufactured using the electrode film on an Al current collector. The specific manufacturing procedure was as follows. A porous separator (340 in FIG. 3) was placed between these electrodes (310, 320 in FIG. 3) in a stainless steel cell (350 in FIG. 3), and EMI-BF$_4$ and 6M KOH (330 in FIG. 3) were respectively filled as an electrolyte to produce an electric double layer capacitor (300 in FIG. 3). The electric double layer capacitor was assembled in a glove box filled with Ar gas.

Figure 22:
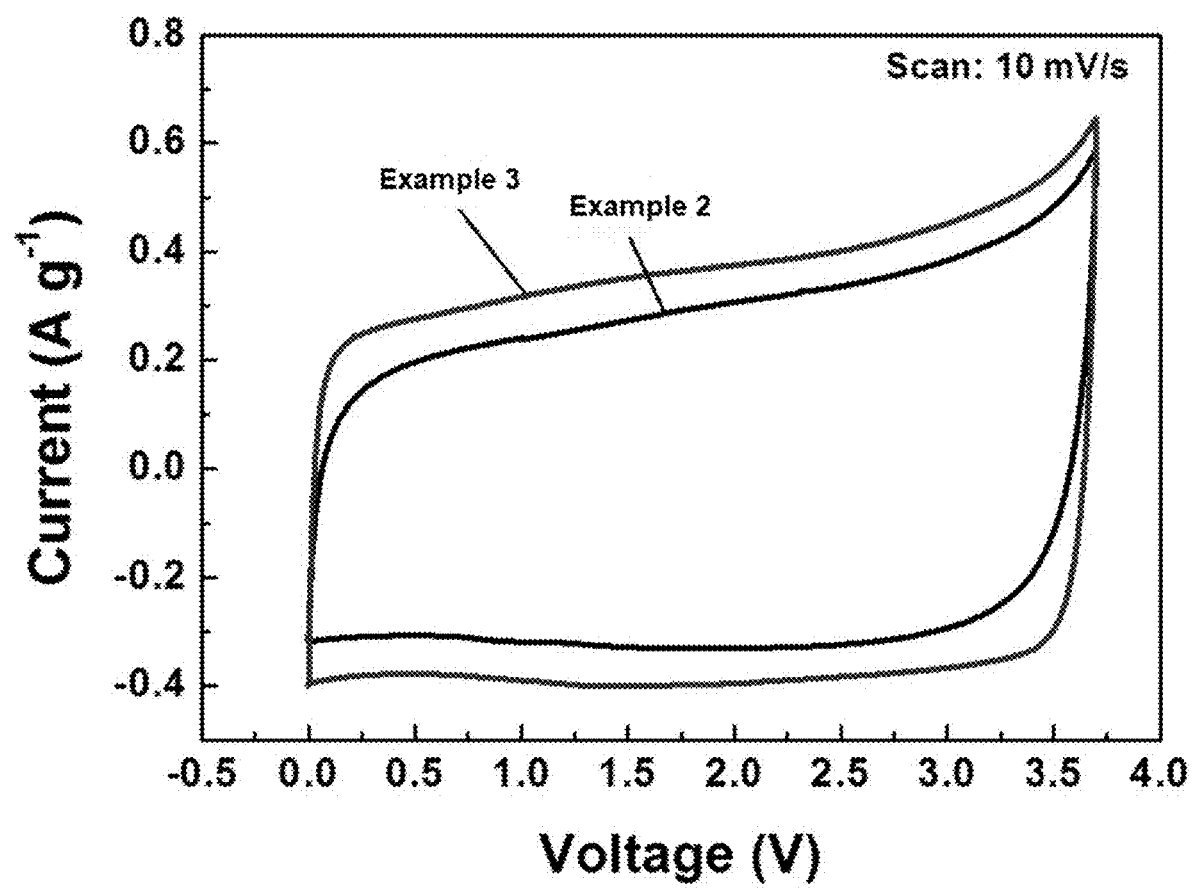
FIG. 22 is a diagram illustrating the specific capacitance-voltage curves (CV curves) when the electrode films of Example 2 and Example 3 are used and the electrolyte is EMI-BF$_4$.
Figure 23:
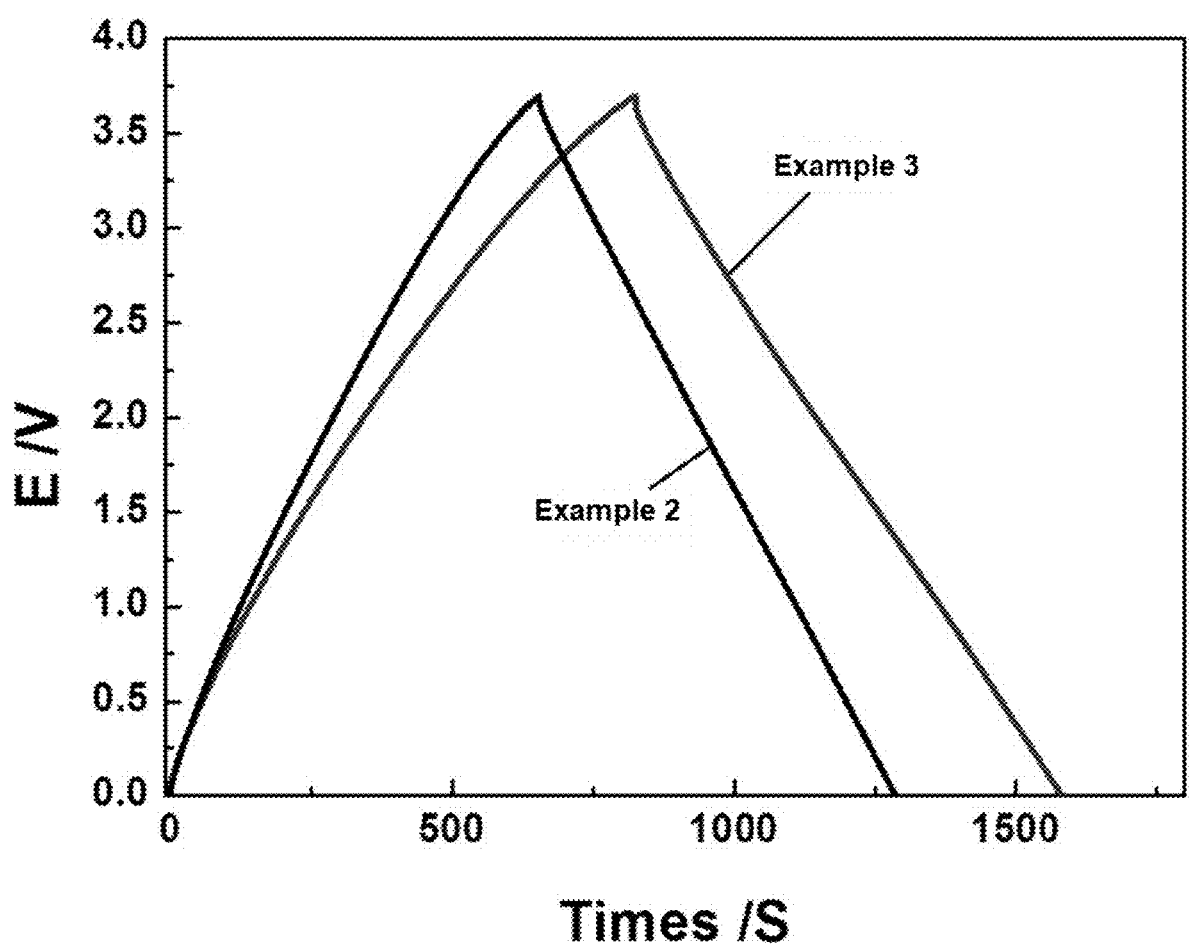
FIG. 23 is a diagram illustrating the charge/discharge curves when the electrode films of Example 2 and Example 3 are used and the electrolyte is EMI-BF$_4$.

Electrochemical measurement of the electric double layer capacitor was performed using a multi-channel potentiostat galvanostat (manufactured by Bio-Logic, VMP-300). Specific capacitance-voltage measurement (CV measurement) and galvanostat charge/discharge measurement were performed at a potential of 3.7 V at room temperature. The results are shown in FIGS. 22 and 23.

The specific capacitance Cs (F/g) was calculated according to the formula $Cs=4 \text{ l}/(mdV/dt)$. Wherein I (A) is a constant current, m (g) is a total mass of the two electrodes, and dV/dt (V/s) is a slope obtained by line fitting to the discharge curve between the Vmax (voltage at the start of discharge) and ½ Vmax. The energy density $E_{cell}$ (Wh/kg) was calculated according to the formula $E_{cell}=CsV^2/8$. The power density $P_{cell}$ (W/kg) was calculated according to the formula $P_{cell}=E_{cell}/t$ (wherein t is the discharge time). The results are shown in Table 4.

Example 3

In Example 3, graphene basic structures manufactured by the method described in Patent Literature 2 were used, and a graphene aggregate was manufactured by mixing the graphene basic structures with a mixed solvent of ethanol and water (5 L) according to the conditions shown in Table 1 (step S210 in FIG. 2). Because the manufacturing procedure of the graphene aggregate is the same as Comparative Example 1 except that water is changed to the mixed solvent of ethanol and water, the description is omitted.

Figure 10:
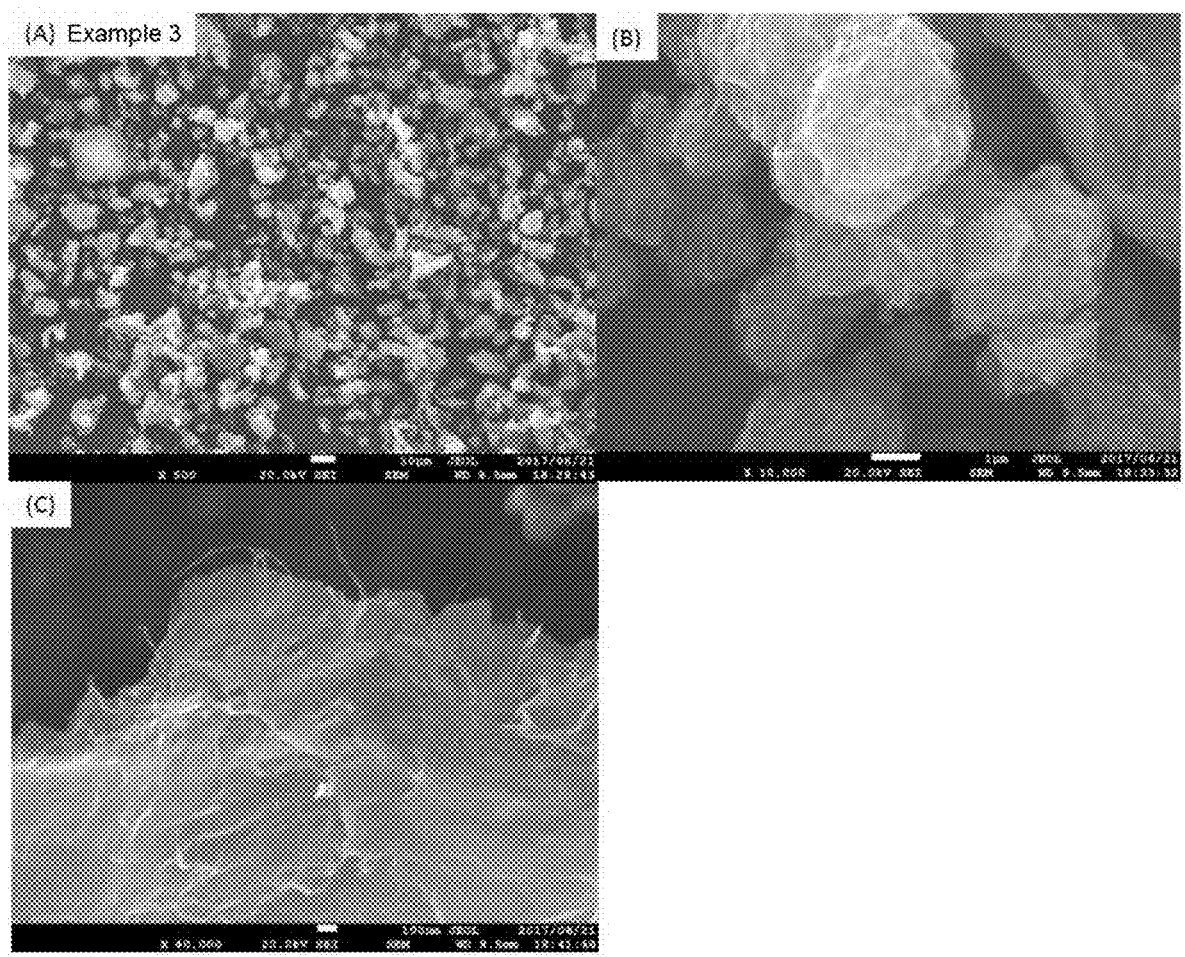
FIGS. 10(A) to 10(C) are diagrams illustrating SEM images of the graphene aggregate of Example 3.
Figure 12:
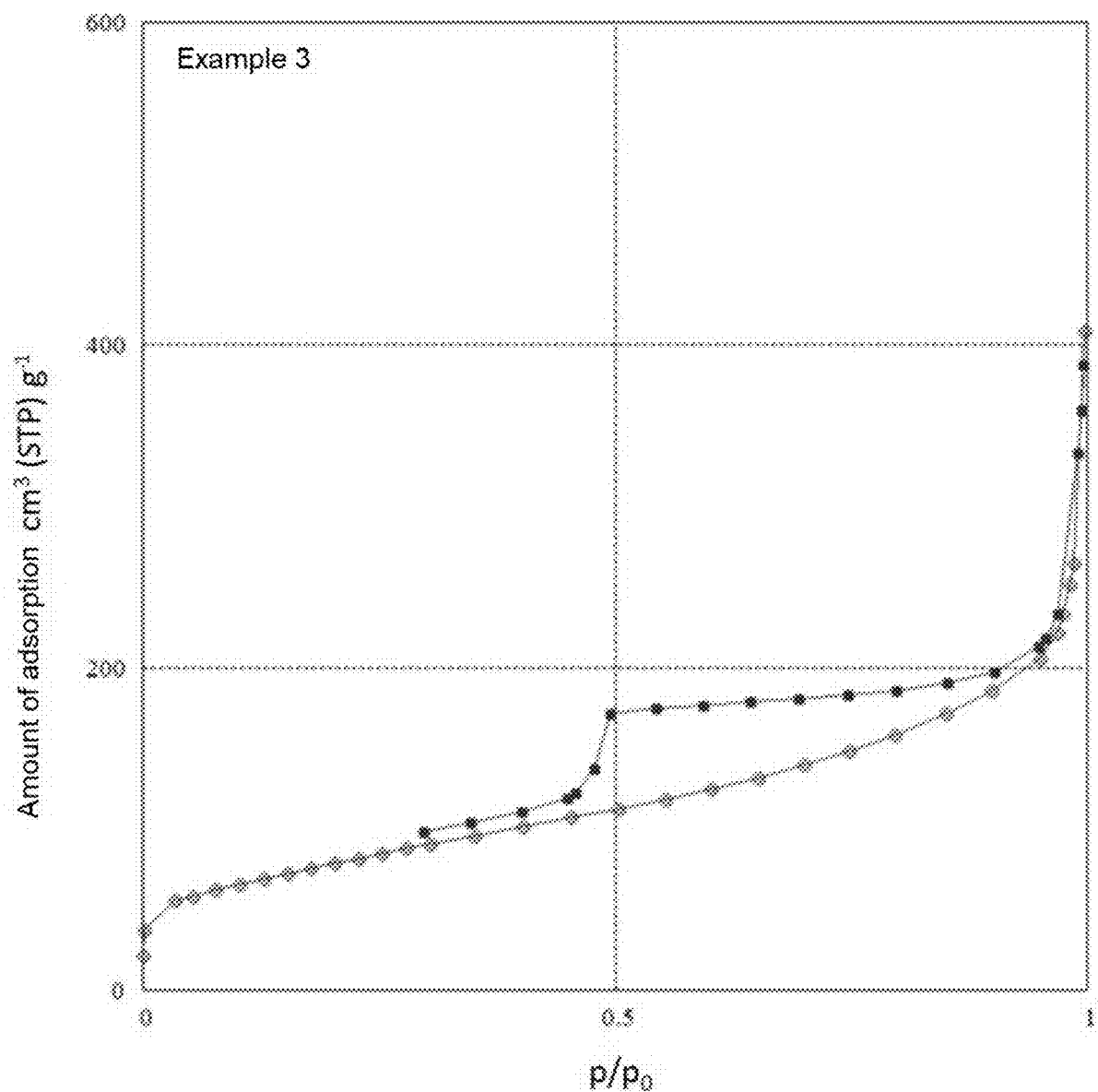
FIG. 12 is a diagram illustrating the nitrogen adsorption/desorption isotherm of the graphene aggregate of Example 3.
Figure 13:
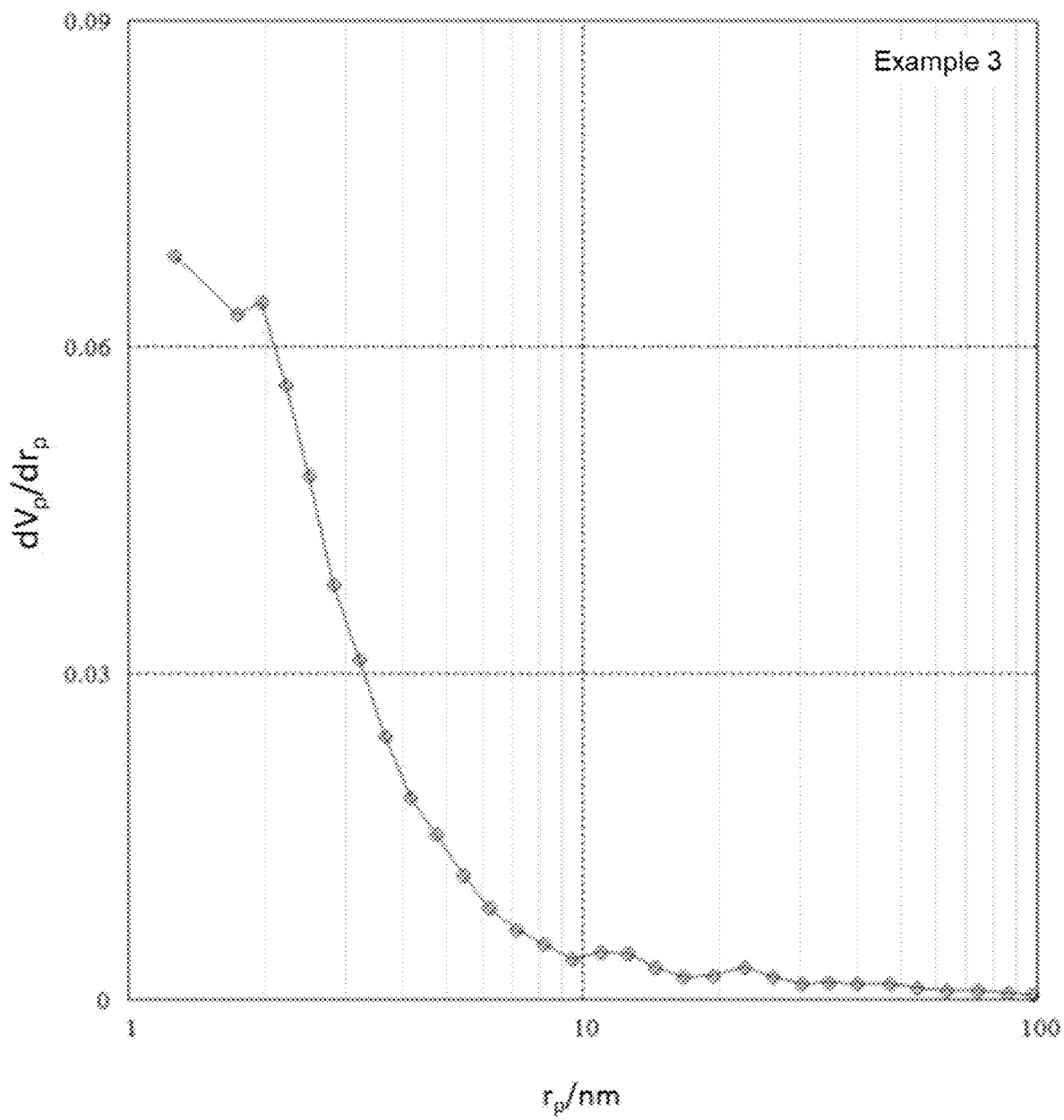
FIG. 13 is a diagram illustrating the pore distribution of the graphene aggregate of Example 3.

The dried product was observed in a similar way to Comparative Example 1, and confirmed to be the graphene aggregate of the present invention. The observation results are shown in FIGS. 7 and 10. The BET specific surface area and BJH pore volume of the product were evaluated from the nitrogen adsorption/desorption isotherm (77K) and pore distribution, respectively. The results are shown in FIGS. 12 and 13, and Table 2.

Figure 15:
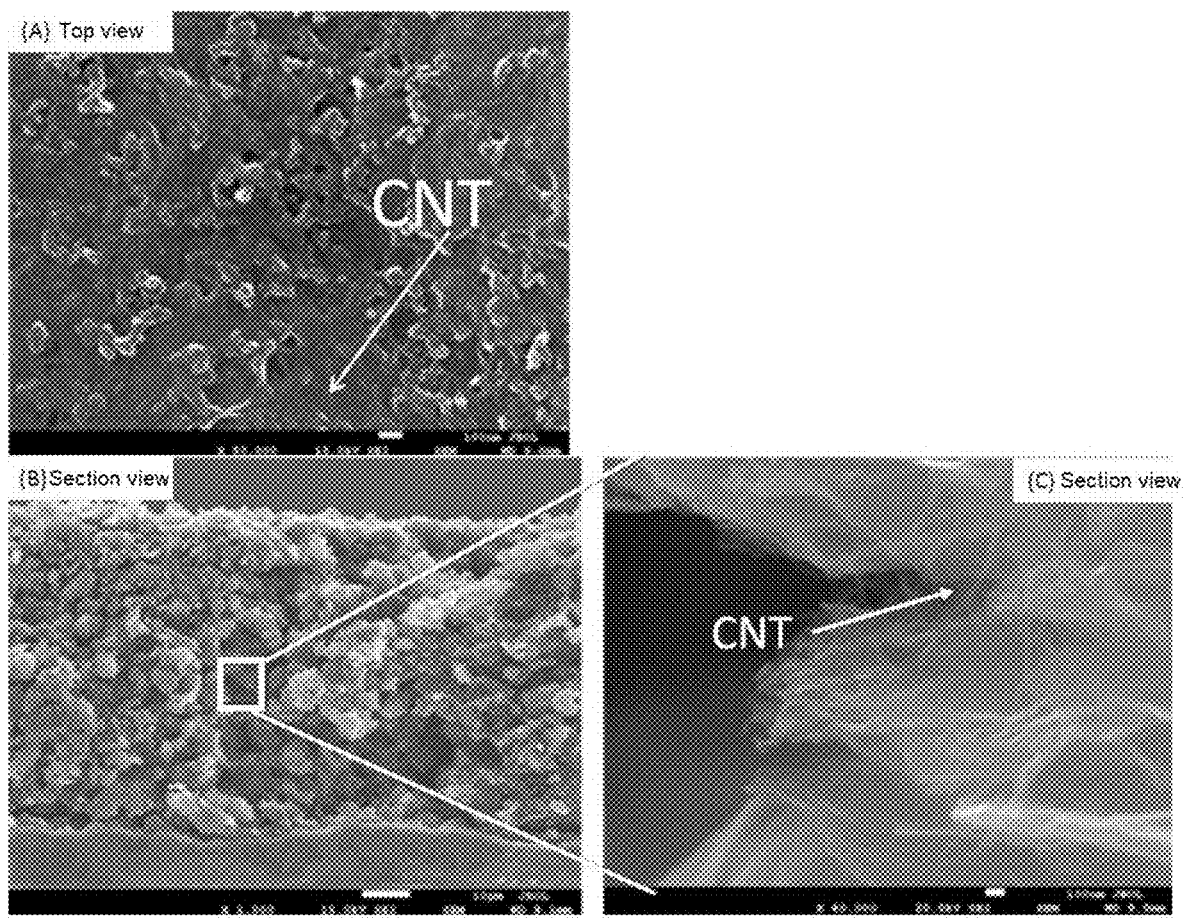
FIGS. 15(A) to 15(C) are diagrams illustrating SEM images of the electrode film of Example 3.
Figure 17:
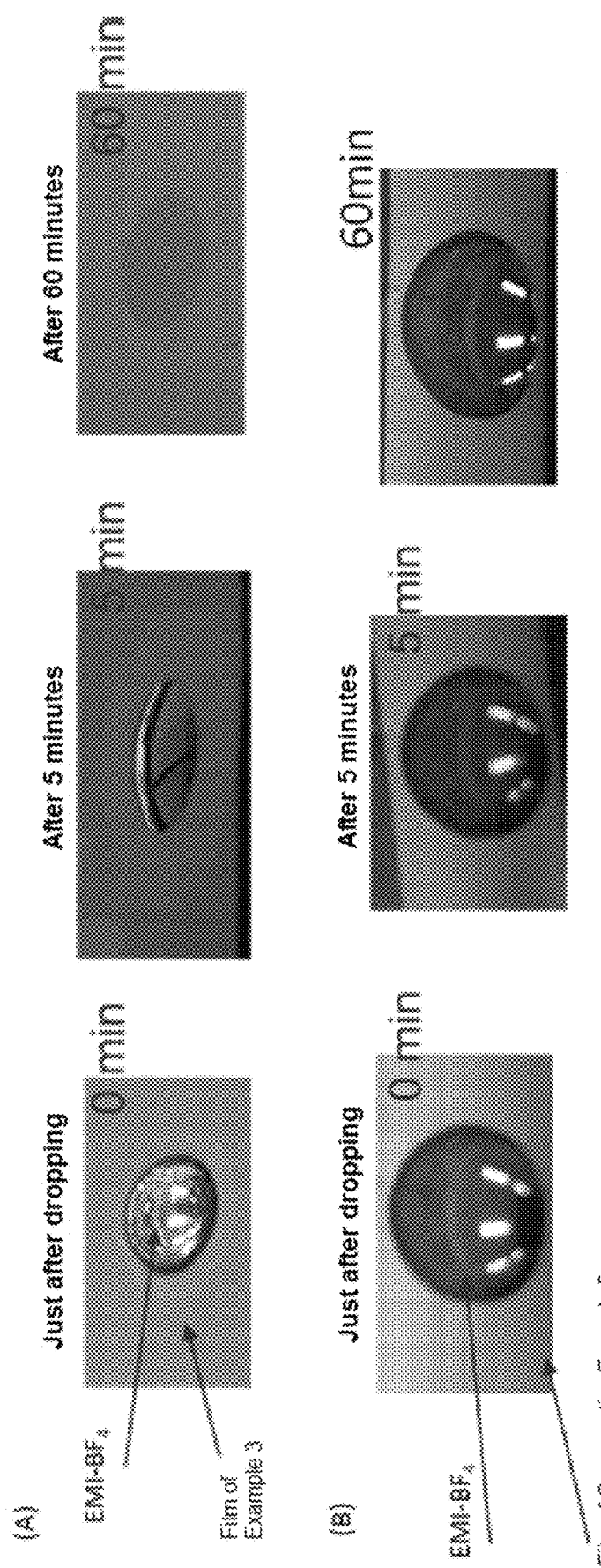
FIGS. 17(A) and 17(B) are diagrams illustrating the wettability of the electrode films of Example 3 and Comparative Example 5.
Figure 18:
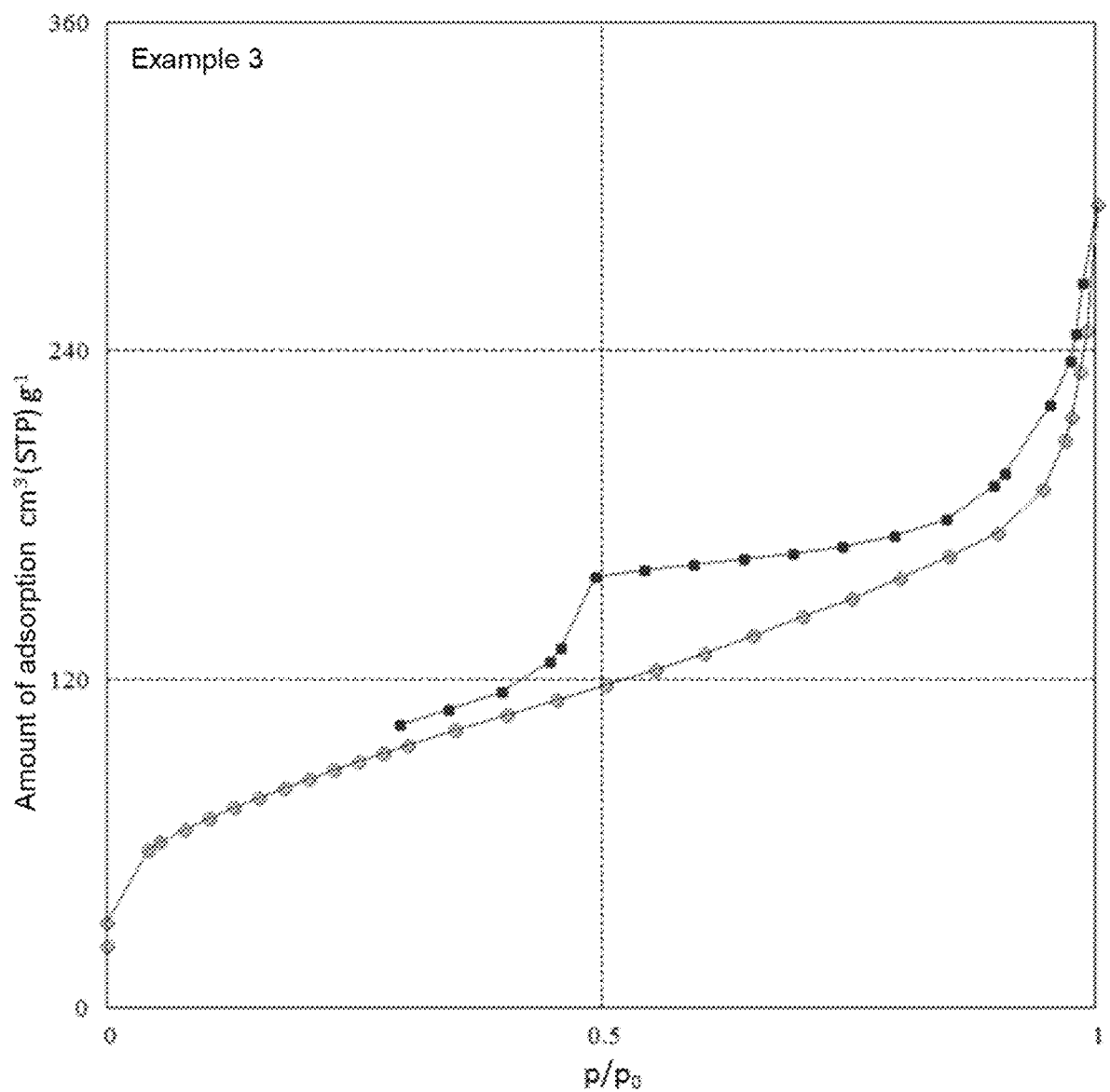
FIG. 18 is a diagram illustrating the nitrogen adsorption/desorption isotherm of the electrode film of Example 3.
Figure 19:
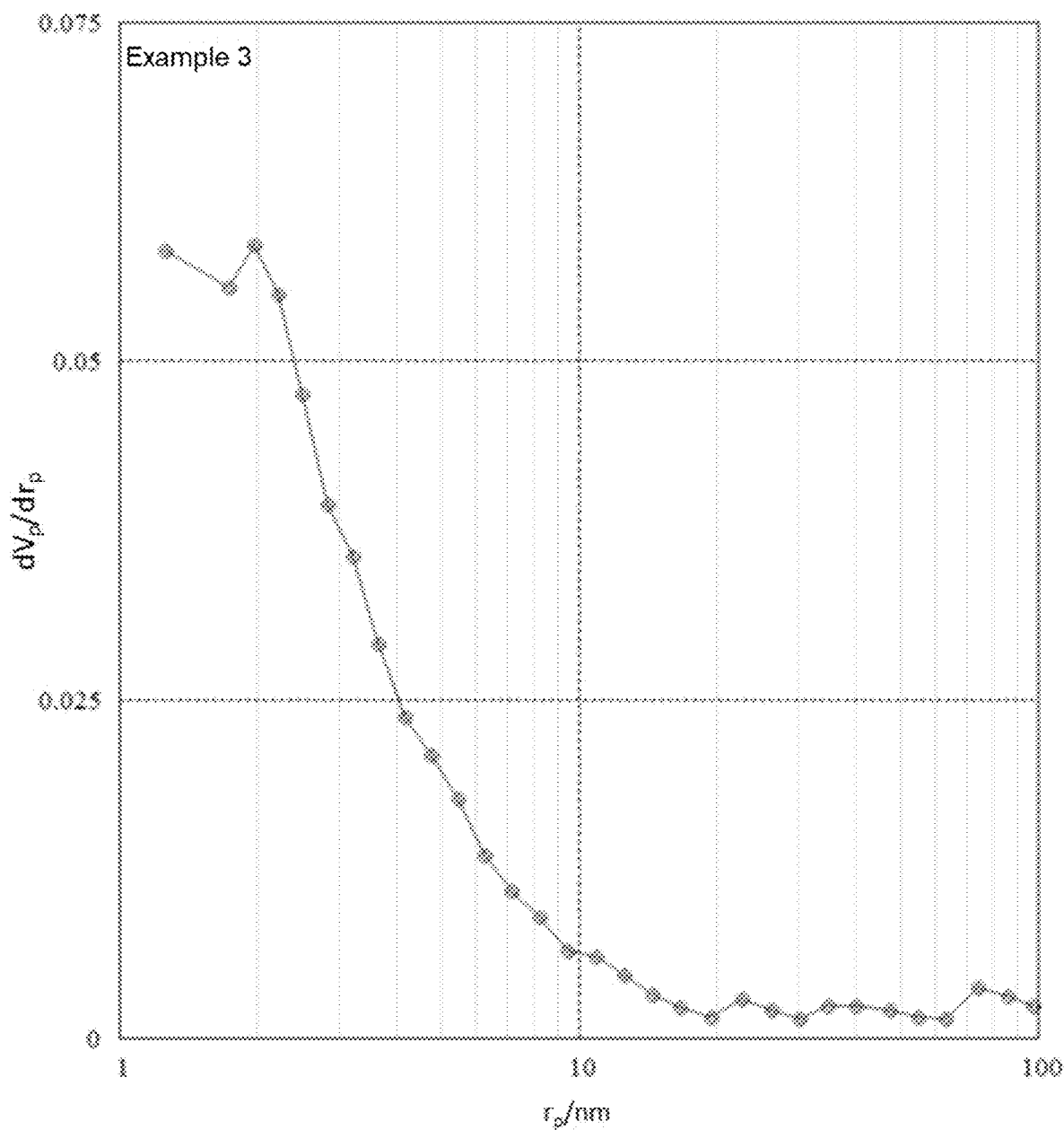
FIG. 19 is a diagram illustrating the pore distribution of the electrode film of Example 3.

The obtained product was formed into a film on an Al current collector in a similar way to Example 2 to manufacture an electrode film. The electrode film was observed in a similar way to Example 2. The results are shown in FIGS. 14 and 15. EMI-BF$_4$ was dropped as an electrolyte on the electrode film of Example 3, and the wettability of the electrode film was examined. The results are shown in FIG. 17. The BET specific surface area, BJH pore volume, density and sheet resistance of the electrode film were determined in a similar way to Example 2. The results are shown in FIGS. 18 and 19, and Table 3.

An electric double layer capacitor was manufactured using the electrode film of Example 3 in a similar way to Example 2. Electrochemical measurement of the electric double layer capacitor was performed, and the energy density and power density were calculated. The results are shown in FIGS. 22 and 23, and Table 4.

Comparative Example 4

In Comparative Example 4, graphene basic structures manufactured by the method described in Patent Literature 2 were used, and a graphene aggregate was manufactured by mixing the graphene basic structures with a mixed solvent of isopropyl alcohol and water (5 L) according to the conditions shown in Table 1. Because the manufacturing procedure of the graphene aggregate is the same as Comparative Example 1 except that water is changed to the mixed solvent of isopropyl alcohol and water, the description is omitted.

Figure 11:
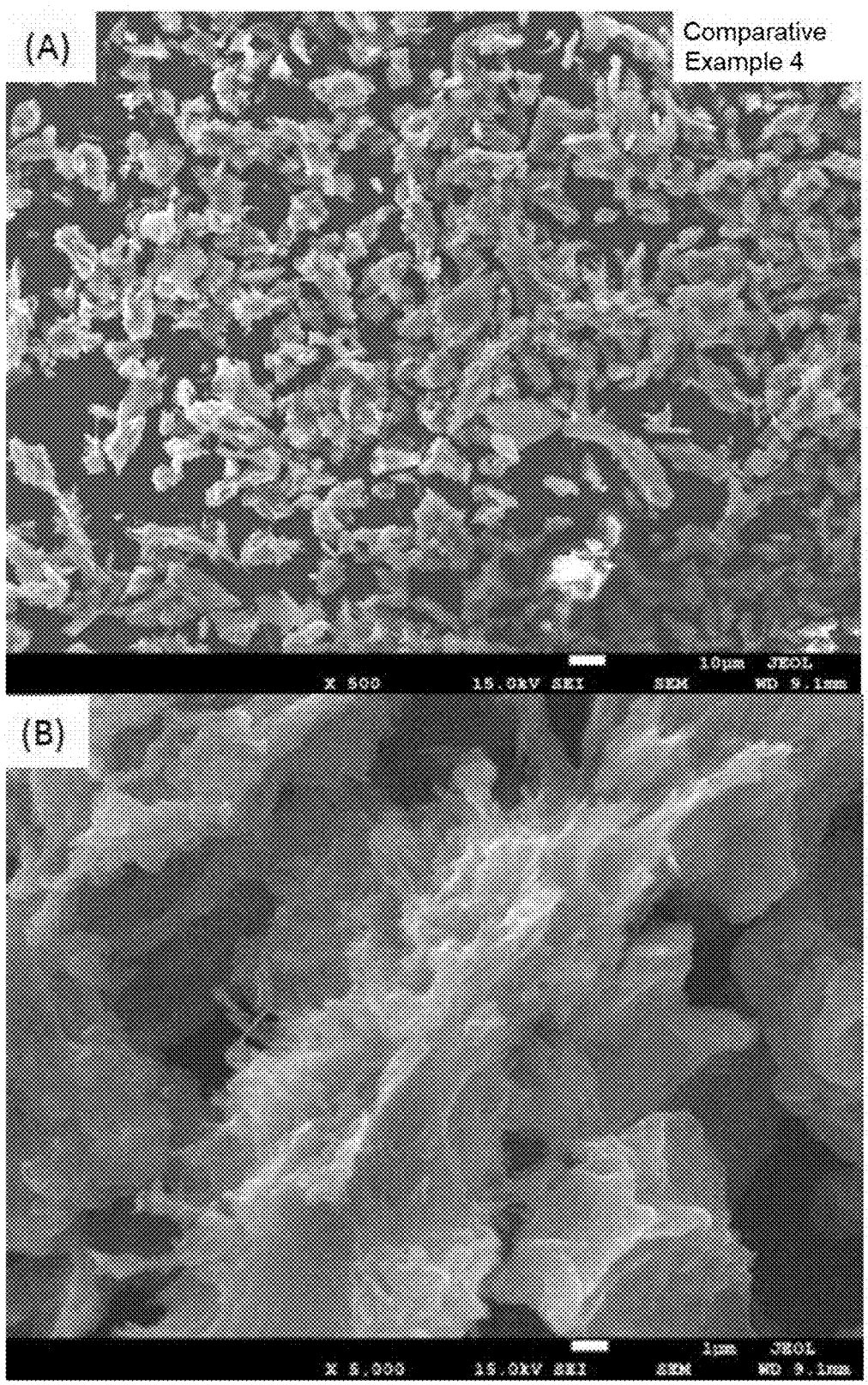
FIGS. 11(A) and 11(B) are diagrams illustrating SEM images of the graphene aggregate of Comparative Example 4.

The dried product was observed in a similar way to Comparative Example 1. The observation results are shown in FIGS. 7 and 11. The BET specific surface area and BJH pore volume of the product were evaluated from the nitrogen adsorption/desorption isotherm (77K) and pore volume, respectively. The results are shown in Table 2.

The obtained product was formed into a film on an Al current collector in a similar way to Example 2 to manufacture an electrode film. The electrode film was observed in a similar way to Example 2. The results are shown in FIG. 14.

Comparative Example 5

Figure 16:
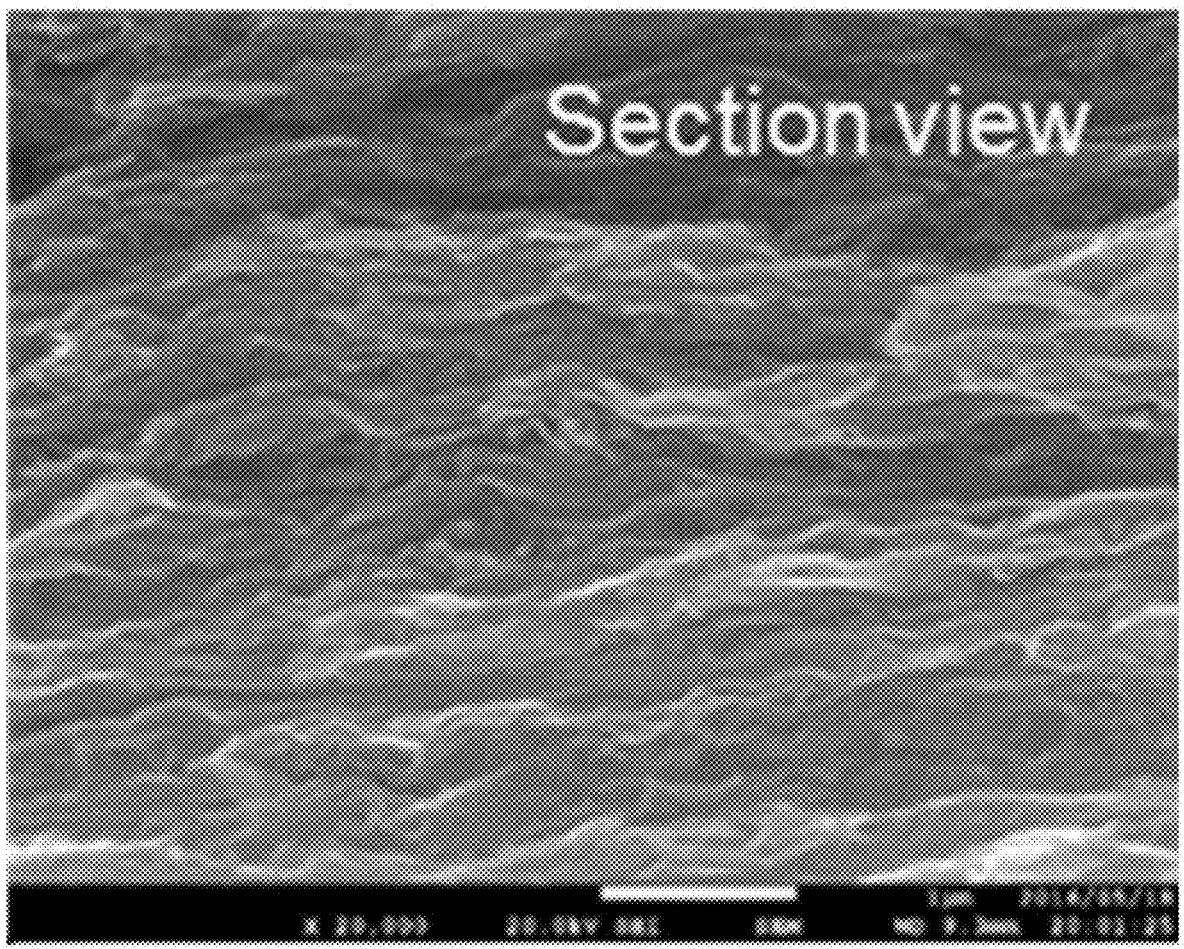
FIG. 16 is a diagram illustrating an SEM image of the electrode film of Comparative Example 5.
Figure 20:
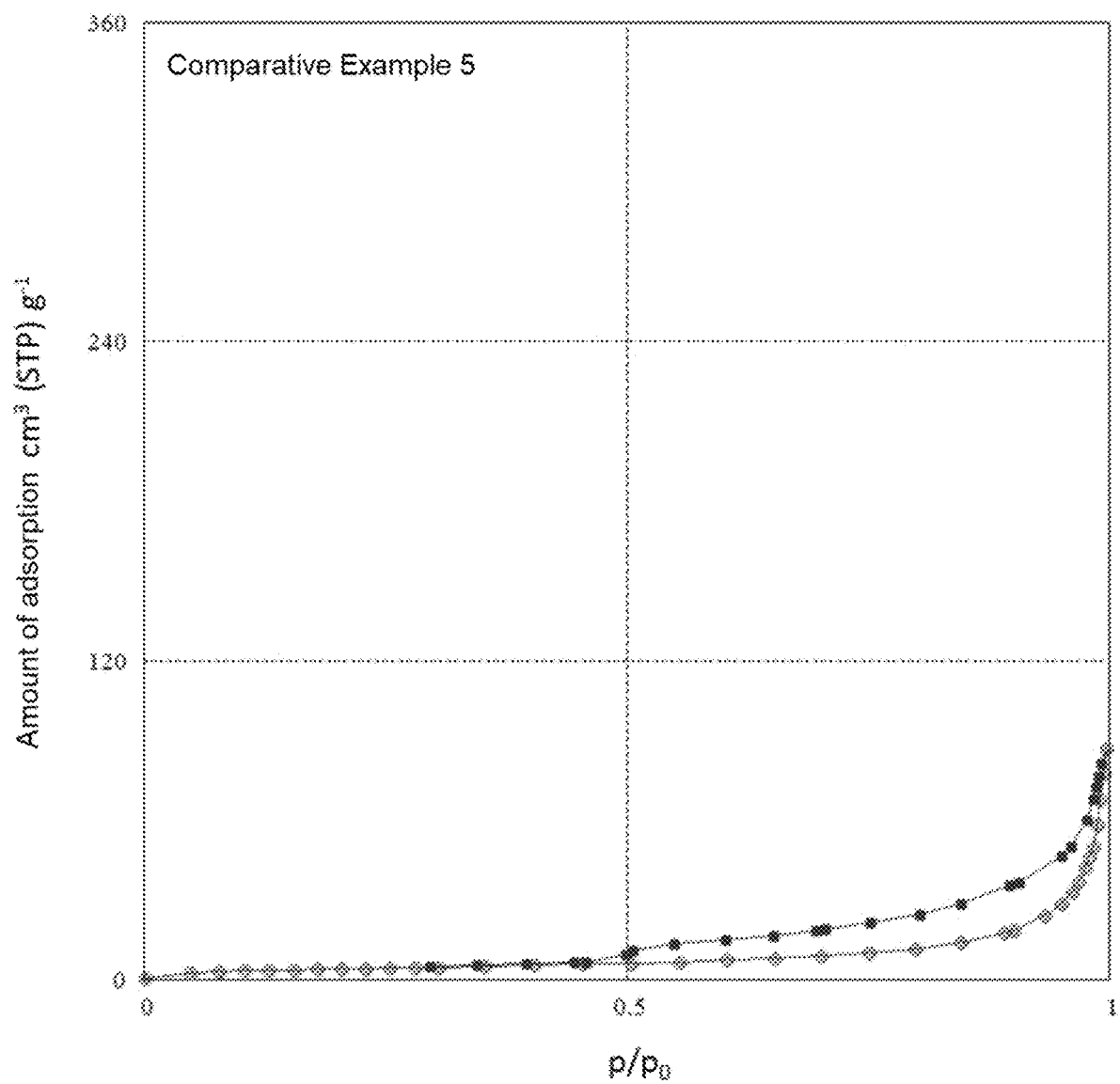
FIG. 20 is a diagram illustrating the nitrogen adsorption/desorption isotherm of the electrode film of Comparative Example 5.
Figure 21:
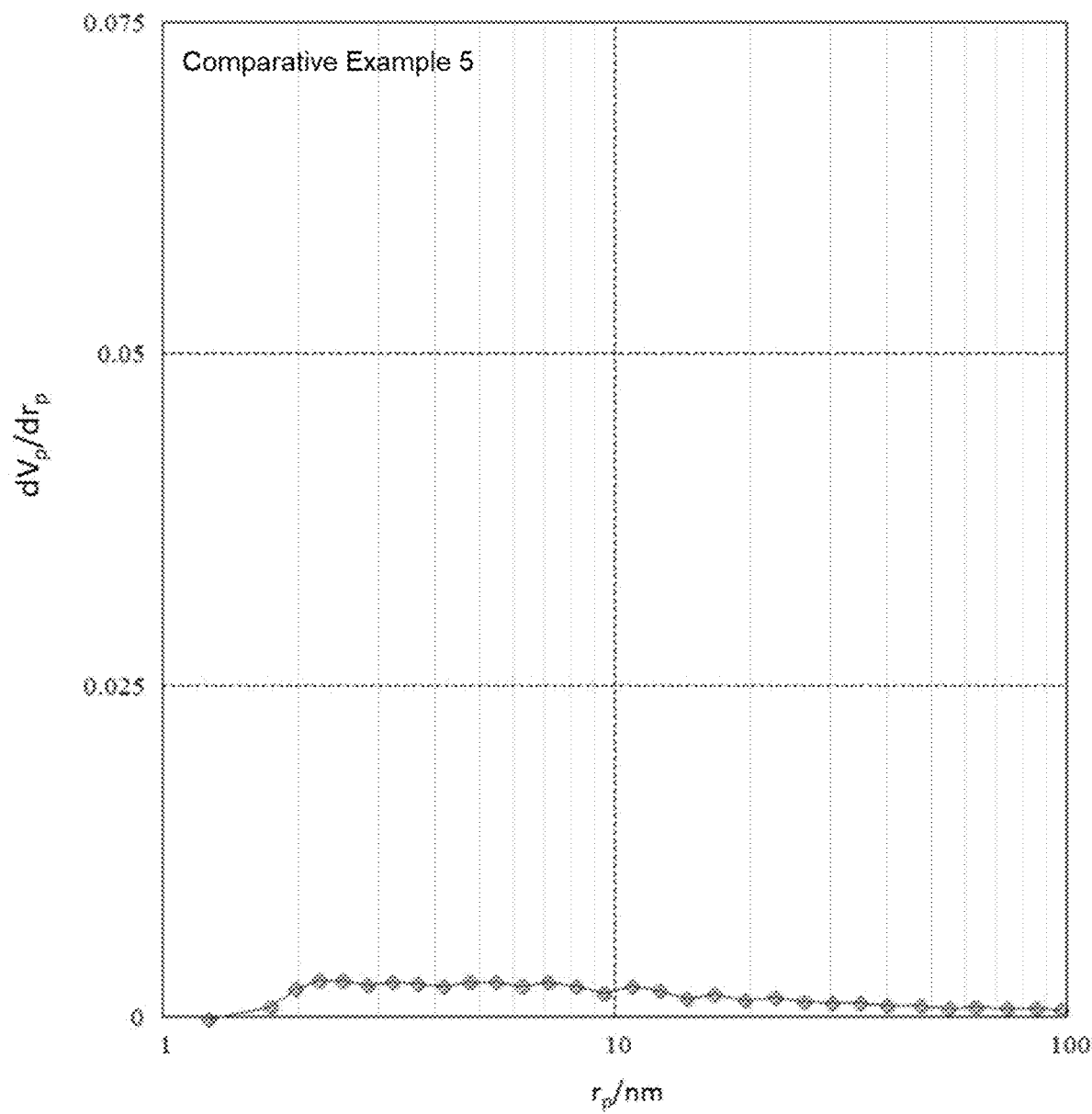
FIG. 21 is a diagram illustrating the pore distribution of the electrode film of Comparative Example 5.

In Comparative Example 5, the graphene basic structures used in each of Comparative Examples/Examples 1 to 4 were formed into a film on an Al current collector without causing aggregation to manufacture an electrode film. An electrode film was produced in a similar way to Example 2 except that the graphene basic structures were used instead of the graphene aggregate. The electrode film was observed and the results are shown in FIG. 16. The wettability of the electrode film of Comparative Example 5 was examined in a similar way to Example 3. The results are shown in FIG. 17. The BET specific surface area, BJH pore volume, density and sheet resistance of the electrode film were determined in a similar way to Example 2. The results are shown in FIGS. 20 and 21, and Table 3.

An electric double layer capacitor was manufactured using the electrode film of Comparative Example 5 in a similar way to Example 2. Electrochemical measurement of the electric double layer capacitor was performed, and the energy density and power density were calculated. The results are shown in Table 4.

It will be described the above results. For simplicity, the manufacturing conditions of the graphene aggregates of Examples/Comparative Examples 1 to 4 are shown in Table 1.

TABLE 1

Manufacturing condition for graphene aggregate of each of Examples/Comparative Examples 1-4

| Example/Comparative Example | Manufacturing method of graphene basic structure | Treatment solvent | Concentration of graphene basic structure in dispersion solution (g/L) | Stirring speed (rpm) | Stirring time (h) |
|---|---|---|---|---|---|
| Comparative Example 1 | Same as that of Patent Literature 2 | Water | 0.18 | 1000 | 2 |
| Example 2 | Same as that of Patent Literature 2 | Ethanol | 0.18 | 1000 | 2 |
| Example 3 | Same as that of Patent Literature 2 | Mixture of ethanol and water (1:1 volume ratio) | 0.18 | 1000 | 2 |
| Comparative Example 4 | Same as that of Patent Literature 2 | Mixture of isopropyl alcohol and water (1:1 volume ratio) | 0.18 | 1000 | 2 |

FIGS. 7(A) to 7(D) are diagrams illustrating the appearance of the graphene aggregates of Comparative Examples/Examples 1 to 4.

FIGS. 7(A) to 7(D) show the appearance of the graphene aggregates of Comparative Examples/Examples 1 to 4, respectively. According to FIGS. 7(A) to 7(D), it was confirmed that all of the graphene aggregates of Comparative Examples/Examples 1 to 4 were in a granular form. The graphene aggregate of Comparative Example 1 was found to have larger grains and larger aspect ratio than those of Examples 2 and 3, and Comparative Example 4.

FIG. 8 is a diagram illustrating an SEM image of the graphene aggregate of Comparative Example 1.

FIGS. 9(A) to 9(C) are diagrams illustrating SEM images of the graphene aggregate of Example 2.

FIGS. 10(A) to 10(C) are diagrams illustrating SEM images of the graphene aggregate of Example 3.

FIGS. 11(A) and 11(B) are diagrams illustrating SEM images of the graphene aggregate of Comparative Example 4.

According to FIG. 8, the graphene aggregate of Comparative Example 1 partially contained grains having a particle diameter of more than 100 μm, many of the grains having an angular shape and having an aspect ratio of more than 5. According to FIGS. 9(A) to 9(C), the graphene aggregate of Example 2 had a spherical shape having a peak in the particle diameter range of 0.5 μm or more and 30 μm or less. According to FIGS. 10(A) to 10(C), the graphene aggregate of Example 3 had a spherical shape having a peak in the particle diameter range of 1 μm or more and 10 μm or less and satisfying an aspect ratio of 0.8 to 1.2. According to FIGS. 11(A) and 11(B), the graphene aggregate of Comparative Example 4 had a peak in the particle diameter range of 0.5 μm or more and 30 μm or less, but had an angular shape rather than a spherical shape, having an aspect ratio of more than 2. In addition, referring to FIGS. 9(B) and 9(C), and FIGS. 10(B) and 10(C), it was found that the graphene planes were arranged in a random manner, and the graphene basic structures were randomly aggregated so as to come into point contact with each other.

FIG. 12 is a diagram illustrating the nitrogen adsorption/desorption isotherm of the graphene aggregate of Example 3.

FIG. 13 is a diagram illustrating the pore distribution of the graphene aggregate of Example 3.

According to FIG. 12, it was found that the adsorption/desorption isotherm of the graphene aggregate corresponded to the IUPAC type IV, similarly to that of the graphene basic structure, and meso-pores existed. The specific surface area of the graphene aggregate calculated from the adsorption/desorption isotherm was 310 m$^2$/g. According to FIG. 13, there was a peak in the range of 0.1 nm or more and 10 nm or less, and the pore volume in that range was 0.451 cc/g. The graphene aggregate of Example 2 also exhibited the similar adsorption/desorption isotherm and pore distribution. The results are summarized in Table 2.

TABLE 2

List of BET specific surface area and BJH pore volume of graphene aggregate of each of Examples/Comparative Examples 1-4

| Example/Comparative Example | Specific surface area (m$^2$/g) | Pore volume (cc/g) |
|---|---|---|
| Comparative Example 1 | 110 | 0.215 |
| Example 2 | 290 | 0.41 |
| Example 3 | 310 | 0.451 |
| Comparative Example 4 | 270 | 0.395 |
| *Comparative Example 5 | 410 | 0.493 |

*Comparative Example 5 represents BET specific surface area and BJH pore volume of graphene basic structure.

From Table 2, it was demonstrated that each of the graphene aggregates of Example 2 and Example 3 was a porous body having relatively large specific surface area and pore volume, and having the characteristics of the graphene basic structure maintained, although it had smaller specific surface area than that of the graphene basic structure (see Comparative Example 5).

From the above, the graphene aggregate of the present invention could be formed by mixing the graphene basic structures, with at least a lower alcohol having 1 or more and 5 or less carbon atoms (and water), and the effectiveness of the manufacturing method of the present invention was demonstrated.

FIGS. 14(A) to 14(C) are diagrams illustrating the state of the electrode films of Examples/Comparative Examples 2 to 4.

FIGS. 14(A) to 14(C) show the states of the electrode films of Examples/Comparative Examples 2 to 4, respectively. According to FIG. 14 (A), the electrode film of Example 2 was relatively uniform. According to FIG. 14 (B), the electrode film of Example 3 was extremely uniform and smooth. According to FIG. 14 (C), the electrode film of Comparative Example 4 was in a wrinkled state and thus could not be used as an electrode. Although not shown, the electrode film of Comparative Example 5 was smooth at first glance.

FIGS. 15(A) to 15(C) are diagrams illustrating SEM images of the electrode film of Example 3.

FIG. 16 is a diagram illustrating an SEM image of the electrode film of Comparative Example 5.

According to FIGS. 15(A) and 15(B), it was found that the spherical graphene aggregate was maintained in the electrode film of Example 3, and that both the upper surface and the inside had a space. According to FIG. 15(C), it was found that the presence of the graphene and carbon nanotubes was confirmed, and that the graphene basic structures were maintained also in the graphene aggregate in the electrode film. Although not shown, the electrode film of Example 2 had the same aspect. On the other hand, according to FIG. 16, the electrode film of Comparative Example 5 was smooth at first glance, but its inside was extremely dense and had no space such that the graphene was arranged in the plane direction.

FIGS. 17(A) and 17(B) are diagrams illustrating the wettability of the electrode films of Example 3 and Comparative Example 5.

FIGS. 17(A) and 17(B) show the wettability of the electrode films of Example 3 and Comparative Example 5, respectively. According to FIG. 17(A), 80% or more of the electrolyte on the electrode film of Example 3 penetrated into the electrode film after 5 minutes, and all penetrated into the electrode film after 60 minutes. On the other hand, according to FIG. 17(B), the electrolyte on the electrode film of Comparative Example 5 hardly penetrated into the electrode film even after 60 minutes. This also indicates that the electrode film of the present invention maintains porosity due to the graphene aggregate and is excellent in adsorption and movement of electrolyte ions.

FIG. 18 is a diagram illustrating the nitrogen adsorption/desorption isotherm of the electrode film of Example 3.

FIG. 19 is a diagram illustrating the pore distribution of the electrode film of Example 3.

FIG. 20 is a diagram illustrating the nitrogen adsorption/desorption isotherm of the electrode film of Comparative Example 5.

FIG. 21 is a diagram illustrating the pore distribution of the electrode film of Comparative Example 5.

According to FIG. 18, it was found that the adsorption/desorption isotherm of the electrode film of Example 3 corresponded to the IUPAC type IV, similarly to those of the graphene basic structure and the graphene aggregate, and meso-pores exist. The specific surface area of the electrode film calculated from the adsorption/desorption isotherm was 280 m$^2$/g. Although this value is slightly smaller than that of the specific surface area of the graphene aggregate, it is suggested that the characteristics of the graphene aggregate are maintained. According to FIG. 19, there was a peak in the range of 0.1 nm or more and 10 nm or less, and the pore volume in that range was 0.324 cc/g. Although not shown, the electrode film of Example 2 also exhibited the similar adsorption/desorption isotherm and pore distribution.

On the other hand, according to FIG. 20, the adsorption/desorption isotherm of the electrode film of Comparative Example 5 did not show clear hysteresis. This also suggests that the electrode film of Comparative Example 5 does not have pores. According to FIG. 21, the pore size distribution of the electrode film of Comparative Example 5 showed no peak, indicating that the pores were blocked due to mixing of the graphene basic structures with the binder or the conductive material. These results are summarized in Table 3.

TABLE 3

Characteristics of electrode film of each of Examples 2 and 3, and Comparative Example 5

| Example/Comparative Example | Film thickness (μm) | Specific surface area (m$^2$/g) | Pore volume (cc/g) | Density (g/cm$^3$) | Sheet resistance (Ω/□) |
|---|---|---|---|---|---|
| Example 2 | 70 | 245 | 0.297 | 0.51 | 3-5 |
| Example 3 | 65-70 | 280 | 0.324 | 0.54 | 0.52-2 |
| Comparative Example 5 | 60 | 15 | 0.09 | 0.71 | 50-70 |

Table 3 also shows the values of the density and sheet resistance. According to Table 3, it was found that the electrode films of Example 2 and Example 3 had a density in a range of 0.2 g/cm$^3$ or more and 0.7 g/cm$^3$ or less. In addition, it was confirmed that all of these electrode films had so low sheet resistance that they had sufficient conductivity as an electrode. In addition, it was confirmed that the electrode films of Example 2 and Example 3 had large specific surface area and large pore volume as compared to those of the electrode film of Comparative Example 5, and thus maintained porosity.

FIG. 22 is a diagram illustrating the specific capacitance-voltage curves (CV curves) when the electrode films of Example 2 and Example 3 are used and the electrolyte is EMI-BF$_4$.

FIG. 23 is a diagram illustrating the charge/discharge curves when the electrode films of Example 2 and Example 3 are used and the electrolyte is EMI-BF$_4$.

Both of the CV curves in FIG. 22 are results with a sweep rate of 10 mV/s. The electrode films of Example 2 and Example 3 both showed rectangular CV curves representing ideal electric double layer capacitors. Although not shown, the electrode film of Comparative Example 5 did not form a rectangular CV curve. Based on the CV curve (electrolyte: EMI-BF$_4$, voltage: 3.7 V), when the specific capacitance (F/g) of the electrode films of Example 2 and Example 3 was calculated, high values of 134±4 and 172±3 were given, respectively. On the other hand, the specific capacitance (F/g) of the electrode film of Comparative Example 5 was 9±2.

The charge/discharge curves in FIG. 23 both showed a constant current charge/discharge curve typical of an electric double layer capacitor. Although not shown, the charge/ discharge curve of Comparative Example 5 had extremely short discharge time. Table 4 shows the calculated energy density and power density based on the obtained specific capacitance. As shown in Table 4, it was shown that when the electrode containing the graphene aggregate was used for a power storage device, the specific capacitance, energy density and power density were all improved.

TABLE 4

Characteristics of coin type cell including electrode film of each of Examples 2 and 3, and Comparative Example 5

| Example/ Comparative Example | Electrolyte | Specific capacitance (F/g) | Energy density (Wh/kg) | Energy density (Wh/kg) |
|---|---|---|---|---|
| Example 2 | EMI-BF$_4$ | 134 ± 4 | 64 ± 2 | 167 |
| Example 3 | EMI-BF$_4$ | 172 ± 3 | 88 ± 1 | 180 |
| Comparative Example 5 | EMI-BF$_4$ | 9 ± 2 | 4 ± 1 | <1 |

*Charge/discharge at 3.7 V, 0.2 A/g

INDUSTRIAL APPLICABILITY

The electrode of the present invention does not impair the superiority of the graphene basic structure even in the film, is excellent in conductivity, and is applicable to power storage devices such as electric double layer capacitors and lithium ion batteries. A power storage device to which the electrode of the present invention is applied achieves high power density and energy density, and is advantageous for wind power generators, electric vehicles and the like.

REFERENCE SIGNS LIST

100 Graphene aggregate
110 Graphene basic structure
120 Graphene
130 Fibrous material
300 Electric double layer capacitor
310 Positive electrode
320 Negative electrode
330 Electrolyte
340 Separator
350 Cell

The invention claimed is:

1. An electrode comprising at least a graphene aggregate having a particle diameter of 0.1 μm or more and less than 100 μm, a conductive material, and a binder,
    wherein the graphene aggregate is an aggregate of graphene basic structures each having graphene layers among which a fibrous material is located,
    wherein the graphene basic structures are aggregated in a random manner such that the graphene basic structures come into point contact with each other, and the plane surfaces of the graphene layers are arranged in a random manner, and
    wherein the specific surface area of the electrode measured by a BET method is in a range of 200 m$^2$/g or more and 1000 m$^2$/g or less, and the pore volume of the electrode measured by a BJH method with regard to pores having a pore diameter in a range of 0.1 nm or more and 10 nm or less is in a range of 0.1 cc/g or more and 1 cc/g or less.

2. The electrode according to claim 1, wherein the graphene aggregate has a particle diameter of 0.5 μm or more and 30 μm or less.

3. The electrode according to claim 1, wherein the graphene aggregate is a porous body.

4. The electrode according to claim 1, wherein the size of the graphene in a longitudinal direction is in a range of 10 nm or more and 10 μm or less.

5. The electrode according to claim 1, wherein the fibrous material is carbon nanotubes.

6. The electrode according to claim 1, wherein the graphene aggregate, the conductive material and the binder satisfy a weight ratio of graphene aggregate:conductive material:binder=80 to 95:0 to 10:1 to 10.

7. The electrode according to claim 1, wherein the conductive material is a carbon material selected from the group consisting of acetylene black, channel black, furnace black and Ketjen black.

8. The electrode according to claim 1, wherein the binder is selected from the group consisting of tetrafluoroethylene resin (PTFE), modified tetrafluoroethylene resin thereof, polyvinylidene fluoride (PVDF), sodium carboxymethylcellulose (CMC) and styrene butadiene rubber (SBR).

9. A method for manufacturing the electrode according to claim 1, comprising:
    a step of mixing graphene basic structures with at least a lower alcohol having 1 or more and 5 or less carbon atoms at a rotational speed of 500 rpm or more and 1500 rpm or less and at a temperature in a range of 15° C. or more and 35° C. or less for a period of 1 hour or more and 10 hours or less to form a graphene aggregate in which the graphene basic structures are aggregated, the graphene basic structures each having graphene layers among which a fibrous material is located, wherein the graphene basic structures are aggregated in a random manner such that the graphene basic structures come into point contact with each other, and the plane surfaces of the graphene layers are arranged in a random manner; and
    a step of forming a film by mixing the graphene aggregate, a conductive material, and a binder.

10. The method according to claim 9, wherein the lower alcohol is selected from the group consisting of methanol, ethanol, 1-propanol, 1-butanol, 2-methyl-1-propanol, 2-butanol and 2-methyl-2-propanol.

11. The method according to claim 9, wherein in the step of forming a graphene aggregate, the graphene basic structures have a concentration in a range of 0.05 g/L or more and 5 g/L or less.

12. The method according to claim 9, wherein the specific surface area of the graphene aggregate measured by a BET method is in a range of 250 m$^2$/g or more and 1000 m$^2$/g or less, and the pore volume of the graphene aggregate measured by a BJH method with regard to pores having a pore diameter in a range of 0.1 nm or more and 10 nm or less is in a range of 0.1 cc/g or more and 1 cc/g or less.

13. The method according to claim 9, wherein in the step of forming a graphene aggregate, water is additionally mixed.

14. The method according to claim 13, wherein the lower alcohol and the water are mixed in a volume ratio of 0.8 to 1.2:1.2 to 0.8.

15. The method according to claim 9, wherein the graphene basic structures are dispersed in a solvent selected from the group consisting of N-methylpyrrolidone (NMP), N,N-dimethylformamide (DMF) and dimethyl sulfoxide (DMSO).

16. A power storage device comprising an electrode and an electrolyte, wherein the electrode consists of the electrode according to claim 1.

17. The power storage device according to claim 16, wherein the power storage device is an electric double layer capacitor or a lithium ion battery.

* * * * *